United States Patent [19]

Terai

[11] Patent Number: 5,207,311
[45] Date of Patent: May 4, 1993

[54] METHOD AND APPARATUS FOR AUTOMATICALLY FEEDING ARTICLES IN ALIGNED CONDITION TO PACKAGING MACHINE

[75] Inventor: Masao Terai, Wakayama, Japan
[73] Assignee: Ryowa Ltd., Japan
[21] Appl. No.: 884,402
[22] Filed: May 18, 1992

[30] Foreign Application Priority Data

Jun. 12, 1991 [JP] Japan .................. 3-168946

[51] Int. Cl.$^5$ ............................ B65G 47/26
[52] U.S. Cl. ................. 198/419.1; 198/431; 198/463.3; 198/463.6; 53/448; 53/543
[58] Field of Search .............. 198/418.1, 419.1, 431, 198/463.3, 463.6; 53/443, 448, 531, 539, 543

[56] References Cited

U.S. PATENT DOCUMENTS

| | | |
|---|---|---|
| 2,793,771 | 5/1957 | Ochs ............................ 198/431 |
| 3,737,021 | 6/1973 | Reth et al. .................... 198/463.3 |
| 4,043,442 | 8/1977 | Greenwell et al. ............ 198/418.1 |
| 4,240,538 | 12/1980 | Hawkes et al. ................ 198/463.6 |
| 4,280,614 | 7/1981 | Balch et al. .................. 198/419.1 |
| 4,765,452 | 8/1988 | Johansson ..................... 198/431 |
| 4,899,866 | 2/1990 | Colamussi .................... 198/418.1 |
| 4,925,005 | 5/1990 | Keller .......................... 198/463.6 |

FOREIGN PATENT DOCUMENTS 24332  5/1983  Japan .

Primary Examiner—Joseph E. Valenza

[57] ABSTRACT

Articles aligned on a belt conveyor are transferred, without being clamped, to predetermined article delivery positions at the packaging machine. To this end, articles 1 are transferred onto a positioning conveyor 21 having comb-like interteeth clearances. Articles 1 are caused to dwell at a predetermined position on the positioning conveyor 21, and the conveyor 21 is stopped and then lowered to allow the upper surface 61a of holding bars 61 of a slide conveyor 22 to be exposed through the comb-like interteeth clearances, whereupon articles 1 transfer onto the upper surface 61a of the holding bars 61. The slide conveyor 22 is advanced to move the holding bars 61 to a location below pivot shutters 79 of an elevating frame 66 which is on standby at its most elevated position. The elevating frame 66 is then lowered to allow the articles 1 on the holding bars 61 to transfer onto the pivot shutters 79. The elevating frame 66 is further lowered and the pivot shutters 79 are opened, whereupon the articles 1 drop by gravity into the article delivery positions 49.

6 Claims, 28 Drawing Sheets

METHOD AND APPARATUS FOR AUTOMATICALLY FEEDING ARTICLES IN ALIGNED CONDITION TO PACKAGING MACHINE

BACKGROUND OF THE INVENTION

1. Field of the Invention

The present invention relates to a method and apparatus for automatically aligning articles, for example, stacks of sliced ham as delivered stack by stack from a slicer, for supply to a packaging machine.

2. Description of the Prior Art

Ham loaves, when sliced by a slicer into ham slices having a thickness of, for example, about 2 or 3 mm each, are usually delivered from the slicing station in the form of ham stacks, each of plural slices (e. g., 5 to 10 slices). These ham stacks are supplied to a ham packaging machine or the like for vacuum packaging.

In order to achieve hygienic supply of, for example, ham stacks to a ham packaging machine, without requiring manual handling, a method for automatically feeding artcles in aligned condition is proposed in Japanese Patent Publication No. 58-24332.

According to this publication, a plurality of articles sequentially delivered in a line can be automatically aligned into position for transport toward the packaging machine and in corresponding relation to predetermined delivery positions at the packaging machine. More specifically, articles transported in a line on a transport conveyor are apportioned by a channelizer into laterally spaced parallel lines corresponding to article delivery positions at the packaging machine and are sequentially transferred onto a parallel transport conveyor. The parallel transport conveyor is pulsatively driven to run in such a way that articles, as they are transferred onto the conveyor, are sequentially carried forward a predetermined distance on the conveyor and then brought to a halt, which process is repeatedly carried out, so that the articles on the parallel transport conveyor are allowed to assume longitudinally and laterally spaced positions corresponding to the article delivery positions at the packaging machine. The thus aligned articles, while held as such, are then carried by catcher pawls of an article transfer device to a location above the article delivery positions at the packaging machine, being then released from the catcher pawls for transfer onto the delivery positions. According to this prior art method, means employed for transferring the aligned articles on the parallel transport conveyor, while they are held in alignment, to the delivery positions at the packaging machine comprises a pivot frame mounted posture-controlledly to free ends of pivotably supported parallel levers, an elevating frame up-and-down movably mounted to a lower portion of the pivot frame, and article catcher pawls attached to the elevating frame. In such method, it is necessary that articles must be clamped at least from lateral sides when they are to be transferred from the terminus of the parallel transport conveyor onto the packaging machine.

In case that the articles are, for example, ham stacks as mentioned above, therefore, the prior art technique involves a problem such that when ham stacks are clamped by the catcher pawls from lateral sides, the ham stacks may become deformed under the pressure of the catcher pawls or some slices of ham may fall off, because the underside of the articles is scarcely supported by the article transfer means during the process of the articles being transferred from the terminus of parallel transfer conveyor to the article delivery positions at the packaging machine. Another problem is that in the case where the clearances between aligned articles are very narrow, the catcher pawls can hardly simultaneously clamp the longitudinally and laterally aligned articles on the parallel transport conveyor.

SUMMARY OF THE INVENTION

Accordingly, it is a primary object of the present invention to provide a method and apparatus for automatically feeding articles in aligned condition to a packaging machine such that articles aligned on a parallel transport conveyor are transferred onto article transfer means, without being clamped from lateral sides, for movement to a location above article delivery positions at the packaging machine, the articles being then allowed to drop by gravity, so that the articles may be automatically transferred to the delivery positions at the packaging machine as they are held in the predetermined alined condition.

In order to accomplish this object, according to one aspect of the invention there is provided a method for automatically feeding articles in aligned condition to a packaging machine wherein plural lines of articles, as they are fed onto a parallel transport conveyor in laterally spaced relationship that corresponds to article delivery positions at the packaging machine, are aligned on the parallel transport conveyor in longitudinally spaced parallel relation, the thus aligned articles being then moved toward the delivery positions at the packaging machine by units of a required number each, said method comprising the steps of:

(a) feeding each required number of articles delivered while held in parallel from said parallel transport conveyor onto a positioning belt conveyor having comb-like interteeth clearances, said positioning conveyor comprising a comb-like frame having a plurality of projecting frames extending in a comb teeth-like fashion from a base frame in the direction of transport of the articles, and belts trained between a driving roller at the rear end of the comb-like frame and driven rollers at respective forward ends of the projecting frames, said comb-like frame being supported for upward and downwand movement relative to the frame of article transfer means;

(b) causing the articles being conveyed by said positioning conveyor to dwell for a while on the positioning conveyor at longitudinally and laterally spaced positions corresponding to the delivery positions at the packaging machine, then stopping the movement of said positioning conveyor;

(c) descending said positioning conveyor slightly to cause holding bars of a slide conveyor to be exposed above the transport plane of said positioning conveyor through said comb-like interteeth clearances thereof, thereby to cause articles on the positioning conveyor to be transferred onto said holding bars at predtermined positions, said slide conveyor including a slider body horizontally movably supported by said frame of the article transfer means, said holding bars being arranged in pairs such that they extend in a fork-like fashion from said slider body in the direction of transport of the articles;

(d) then advancing the slide conveyor a predetermined distance thereby to move the articles on said holding bars to a location immediately above the delivery positions at the packaging machine as they are kept resting on said bars at the predetermined positions;

(e) elevating an elevating frame vertically movably supported by said frame of the article transfer means to a position at which the upper surface of pivot shutters mounted to said elevating frame is positioned slightly above the upper surface of said holding bars, thereby to cause the articles on said holding bars to be transferred onto said pivot shutters; and (f) moving the slide conveyor backward to its original position, then descending the elevating frame and opening the pivot shutters to allow the articles thereon to drop toward the delivery positions at the packaging machine.

According to another aspect of the invention, there is provided an apparatus for automatically feeding articles in aligned condition to a packaging machine, including a parallel transport conveyor equipped with aligning means for aligning plural lines of articles in parallel on the parallel transport conveyor as they are fed onto the conveyor in laterally spaced relationship that corresponds to article delivery positions at the packaging machine, and article transfer means arranged between a terminal portion of the parallel transport conveyor and the packaging machine for moving the articles aligned on the parallel transport conveyor toward the delivery positions at the packaging machine by units of a required number each, said article transfer means comprising:

(a) a positioning conveyor, a slide conveyor, and loading means which are sequentially arranged in succession to said parallel transport conveyor;

(b) said positioning conveyor comprising a comb-like frame having a plurality of projecting frames extending in a comb teeth-like fashion from a base frame in the direction of transport of the articles, a driving roller rotatably mounted at the rear end of the comb-like frame, driven rollers rotatably supported at respective forward ends of the projecting frames, and belts trained between said driving roller and said driven rollers, said comb-like frame being upward and downward movably supported by the frame of said article transfer means, vertical drive means connected to said comb-like frame for vertically displacing the transport plane of the positioning conveyor by a predetermined quantity, and stoppers disposed above the positioning conveyor for engagement with the positioning conveyor so as to act on the articles being conveyed by said conveyor to bring the articles into alignment in corresponding relation to the delivery positions at the packaging machine;

(c) said slide conveyor comprising a slider body horizontally movably supported by the frame of the article transfer means for movement in the direction of transport of the articles, and holding bars arranged in pairs, one pair for each longitudinal line of articles aligned in parallel on said positioning conveyor, such that they extend in a fork-like fashion from said slider body in the direction of transport of the articles, longitudinal drive means connected to said slider body for back-and-forth movement of the slider body between a retreated position at which said holding bars are caused to overlap said positioning conveyor in the direction of transport of the articles and an advanced position at which the holding bars are kept away from overlapping said positioning conveyor, said holding bars being mounted to the slider body at such a position and at such a level that they are exposed above the transport plane of said positioning conveyor between respective belts thereof when said positioning conveyor is lowered at the retreated position at which said holding bars overlap the positioning conveyor and that they are retracted to a location below the transport plane of the positioning conveyor when said positioning conveyor is elevated; and (d) said loading means comprising an elevating frame disposed above the article delivery positions at the packaging machine and vertically movably supported by the frame of the article transfer means, said loading means positionally overlapping said holding bars of said slide conveyor at their advanced position, said elevating frame equipped with vertical drive means for elevating and lowering said frame while kept in a horizontal position and having a plurality of holes formed therein for passage of dropping articles in corresponding relation to the article delivery positions below said elevating frame, pairs of pivot shutters rotatably mounted to said elevating frame at a position slightly above the surface thereof such that said pairs of pivot shutters partially close said holes at a level above the holes and from both sides thereof, with a space left between each pair of said pivot shutters that is sufficient to allow each pair of said holding bars of the slide conveyor to be positioned, and rotation drive means for causing articles to drop after they are received onto the pivot shutters.

In the method and apparatus according to the invention, means for transporting articles aligned on the parallel transport conveyor in longitudinally and laterally spaced relationship, by units of a required number each from the terminus of the parallel transport conveyor to the article delivery positions at the packaging machine, comprise a positioning conveyor, a slide conveyor, and loading means as aforesaid, which are sequentially arranged in succession to the parallel transport conveyor. According to the method and arrangement of the invention for automatic supply of articles in aligned condition, therefore, by interemittently delivering articles by units of required number each from the terminus of the parallel transport conveyor it is possible to supply the required number of articles each time to the article delivery positions at the packaging machine.

When the slide conveyor is moved to its retreated position, holding bars are caused to overlap the phase of the positioning conveyor in the direction of transfer of articles.

The holding bars are arranged in pairs, one pair for each longitudinal line of articles of those aligned in parallel, and extend in a fork-like fashion from the slider body in the direction of transport of the articles, the holding bars being respectively located between the projecting frames of the positioning conveyor which are arranged in a comb teeth-like fashion, or in the comb-like interteeth clearances of the positioning conveyor. When the positioning conveyor, which is up-and-down movable, is lowered, the holding bars are exposed above the plane of transport of the positioning conveyor through the comb-like interteeth clearances, and when the positioning conveyor is elevated, the holding bars are retracted to a position below the transport plane of the positioning conveyor. Therefore, when the positioning conveyor is held in its elevated position, articles carried forward on the parallel transport conveyor can be transferred onto the positioning conveyor, the articles so transferred being then conveyed forward by the positioning conveyor. Stoppers are arranged in the transport path of the positioning conveyor as already mentioned. When these stoppers act on the articles being transported on the positioning conveyor, the articles are caused to slip on the conveyor at respective positions at which they are acted upon by the stoppers, so that each required unit of articles transferred onto the positioning conveyor can be caused to dwell on the positioning conveyor while being held in alignment correspondingly to the delivery positions at the packaging machine. The process of causing articles to dwell in aligned condition on the positioning conveyor is effected at a level above the holding bars of the slide conveyor in such a way that the articles are positioned relative to the holding bars. When the articles are aligned in manner as described above, therefore, by stopping and lowering the positioning conveyor, the articles on the conveyor can be transferred onto the fork-like holding bars, which are provided in pairs, while being held in aligned condition.

With articles positioned on the holding bars of the slide conveyor while held in alignment in manner as stated above, the pivot shutters arranged on the elevating frame of the loading means, which frame is disposed above the article delivery positions at the packaging machine, are held in their article receiving position (horizontal, closed position), and the elevating frame is held in its lowered position. In that condition, the slide conveyor is advanced a predetermined distance. In this way, the respective articles on the holding bars can be positioned immediately above the article delivery positions, with the elevating frame positioned between the articles and the delivery positions.

Each pair of pivot shutters, at their closed position (article receiving position), is sufficiently spaced from each other to allow one pair of holding bars to be positioned therebetween. The elevating frame is formed with holes for allowing dropping articles to pass therethrough, in corresponding relation to the article delivery positions below the frame. Therefore, when the elevating frame is elevated to a position such that the upper surface of the pivot shutters held in the article receiving position (closed position) is slightly higher than the upper surface of the holding bars, articles carried to said receiving position while resting on the holding bars are transferred to the pivot shutters in such a manner that each article is positioned to rest on one pair of pivot shutters.

When such condition is reached, the slide conveyor is retreated, and then the elevating frame is lowered to a position immediately above (nearest to) the article delivery positions at the packaging machine, with the articles kept as they rest on the pivot shutters.

After the elevating frame is lowered as aforesaid, the pivot shutters are opened, whereupon the articles on the shutters fall by gravity while being kept in their aligned condition, onto the article delivery positions at the packaging machine passing through the holes formed in the elevating frame.

In case that the loading means include pusher plates vertically movably supported by the frame of the article transfer means, simultaneously upon the pivot shutters being opened, the pusher plates are lowered to act on individual articles allowed to drop through the holes in the elevating frame. In this case, the articles supplied to the delivery positions can be accurately forced into position even if receiving pockets at the delivery positions are such that their inner diameter is only slightly larger than the outer diameter of the articles.

Where guide plates for guiding articles to the article delivery positions while in abutment with the articles as they drop through the holes in the elevating frame are provided adjacent the holes, it is possible to achieve more accurate supply to the article delivery positions, because the articles can be positively guided while being allowed to assume a proper dropping posture.

DETAILED DESCRIPTION OF THE INVENTION

The method and apparatus of the invention will now be described in further detail with reference to the accompanying drawings. In the following description, the invention is, by way of example, embodied as a method and apparatus for automatically feeding ham stacks in aligned condition to a ham packaging machine.

Figure 1:
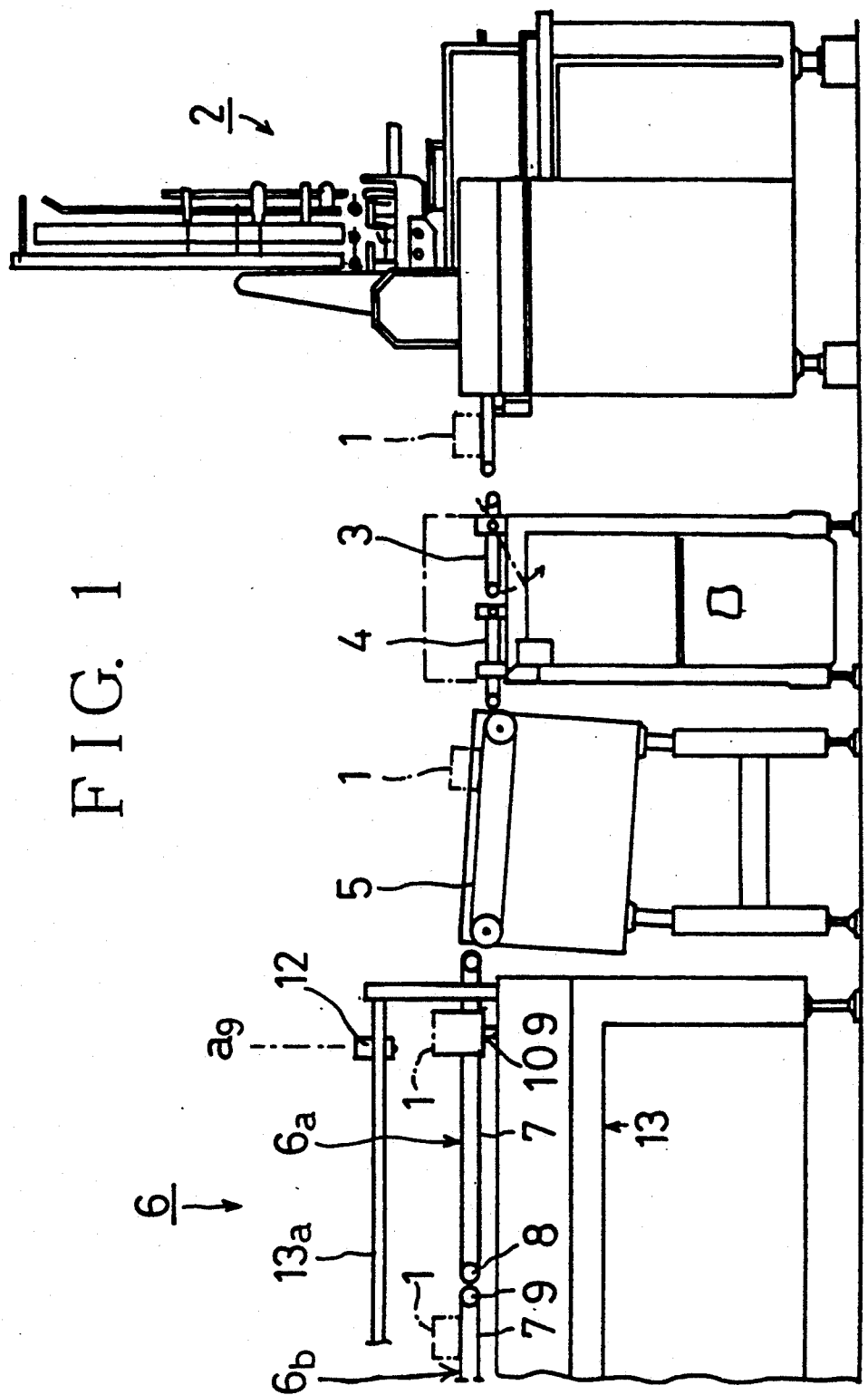
FIG. 1 is a side view of a first stage portion of the apparatus for automatically feeding articles in aligned condition to the packaging machine according to the present invention.
Figure 2:
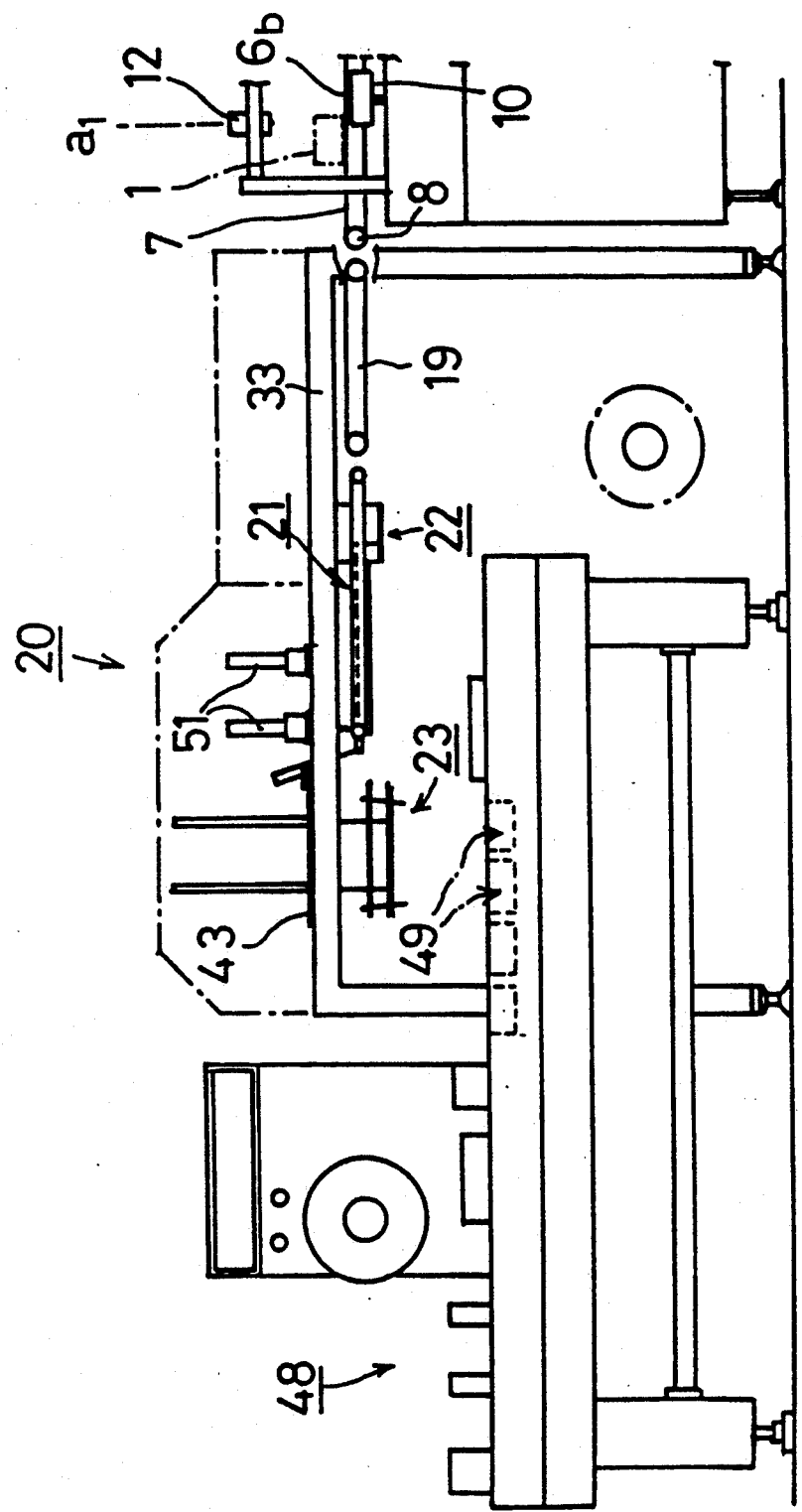
FIG. 2 is a side view of a second stage portion of the apparatus.
Figure 3:
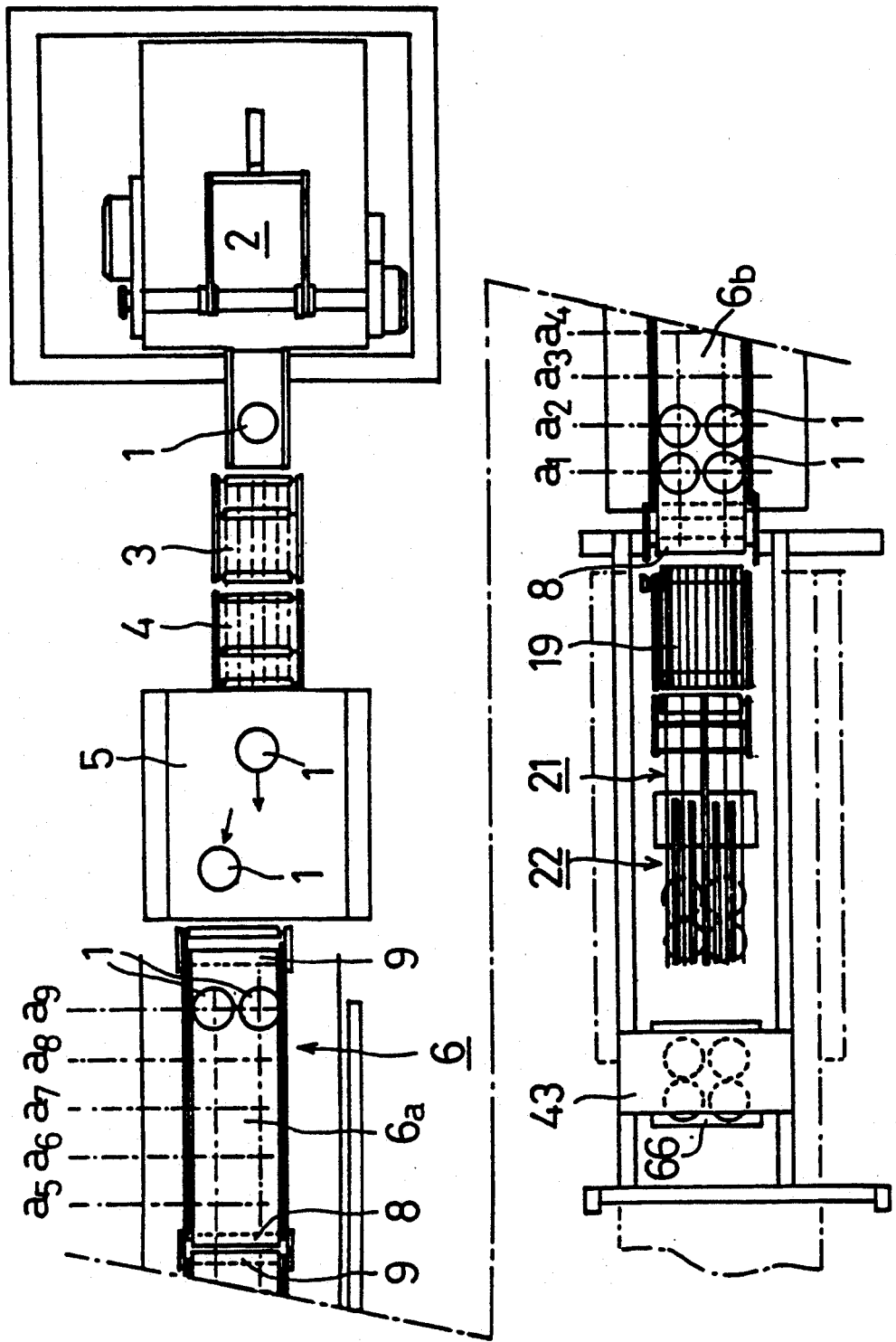
FIG. 3 is a plan view of the apparatus.

As FIGS. 1 to 3 illustrate, a ham loaf, as it is sliced by a slicer 2, is delivered from the slicer 2 in the form of ham stacks of plural slices each, which in turn are sequentially fed onto a reject unit 3. The reject unit 3 is operative to deliver forward good ham stacks only after defective ham stacks, if any, are eliminated from the line by an operator.

Ham stacks 1 which have passed through the reject unit 3 come out in succession one to another in one line on a single-line transport conveyor 4, and they are channelized into two lines (or alternatively, more than two lines) by a channelizer 5 of the known type.

Ham stacks 1 which have been channelized into two lines by the channelizer 5 come out in alternate two lines, right and left. Therefore, a parallel transport conveyor 6 as described hereinbelow is provided ahead of the transport path of the channelizer 5.

The parallel transport conveyor 6 is designed so that a large number of ham stacks 1 delivered in two alternate lines from the channelizer 5 are caused to dwell on the conveyor 6 while being aligned in parallel by rows of two stacks each so that ham stacks 1 of good quality may be intermittently fed in succession and without interruption toward a subsequent stage or transfer unit, even if any of the ham stacks 1 from the slicer 2 are eliminated as defective stacks at the reject unit 3.

Figure 4:
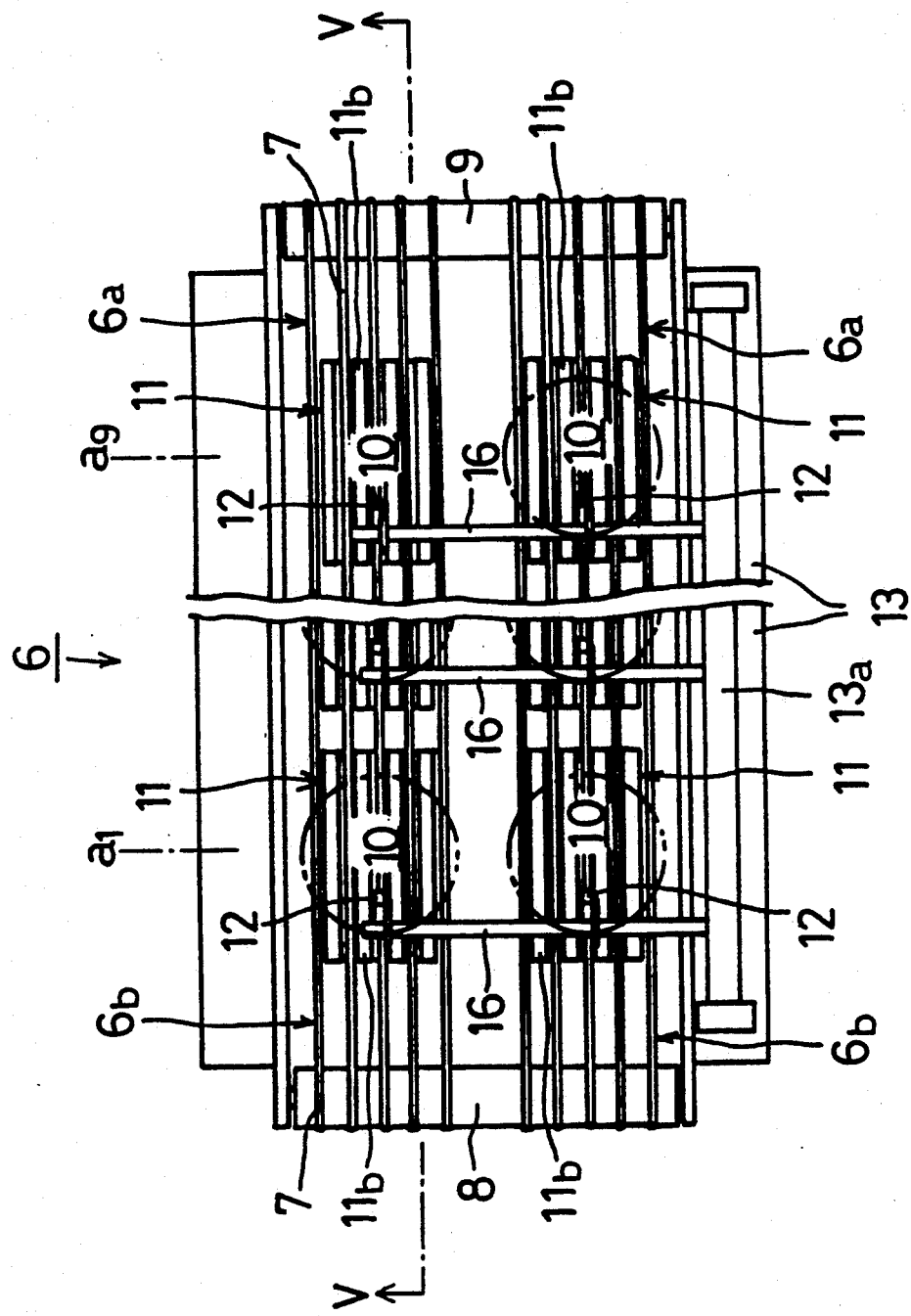
FIG. 4 is a partially broken-away plan view of a parallel transport conveyor.

The parallel transport conveyor 6 in the present embodiment comprises two belt conveyors 6a, 6a arranged serially in the direction of ham stack transport as shown in FIG. 3, each belt conveyor 6a, 6b comprising a plurality of round belts 7 trained between front and rear rollers 8, 9 as shown in FIGS. 3 and 4. Between opposite ends of the parallel transport conveyor 6 are arranged a plurality of unit dwell devices 10 in two lines along the path of transport of ham stacks 1 and in longitudinally and laterally spaced relationship that corresponds to longitudinally and laterally spaced ham-stack delivery positions 49 at a packaging machine 48 which will be described hereinafter.

Each unit dwell device 10, as shown in detail in FIGS. 4 and 5, comprises a stack receiving block 11 disposed below the belt conveyor 6a (or 6b), and an optical sensor 12 disposed above the belt conveyor 6a (or 6b).

Each stack receiving block 11 comprises a base plate 11a, and a multiplicity of bearing ledges 11b having a gantry configuration in side view which are mounted on the base plate 11a, the stack receiving block 11 being secured to the top end of a rod 14 up-and-down movably supported by a frame 13 of the parallel transport conveyor 6 at a suitable location, with an air cylinder 15 connected to the rod 14. Each bearing ledge 11b is positioned between adjacent round belts 7 of the belt conveyor 6a (or 6b) as viewed in plan so that when the air cylinder 15 is driven to move the receiving block 11 upward or downward, the upper surface of the bearing ledge 11b is exposed above or retracted below the belt conveyor 6a (or 6b) through the gap between adjacent round belts 7. Each optical sensor 12 is mounted suitably to a sensor mounting bar 16 which is attached at its base end to a gantry shaped frame portion 13a at one side of the frame 13 (see FIG. 4) and overhangs the belt conveyor 6a (or 6b).

The unit dwell devices 10, constructed as above described, are controlled in the following manner so that two lines of ham stacks 1 transferred in succession onto the belt conveyors 6a and 6b which are constantly in operation may be aligned in parallel thereon and caused to dwell thereon.

Figure 5:
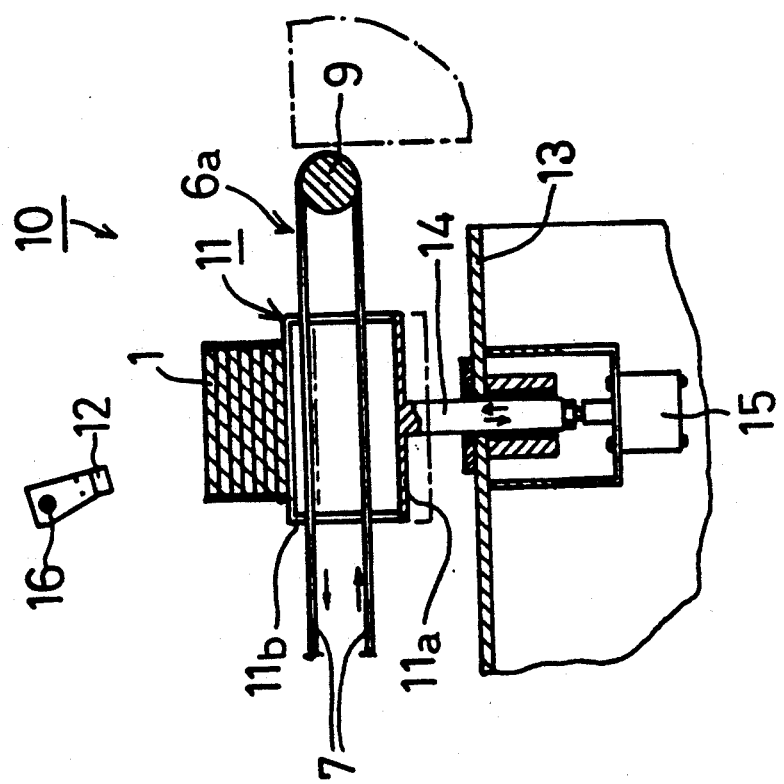
FIG. 5 is a vertical sectional view in side elevation of a unit dwell device.

Each unit dwell device 10 is of such arrangement that when the sensor 12 detects a ham stack 1, the stack receiving block 11 is elevated from a retracted position (a position represented by long and short dash lines in FIG. 5) to an exposed position (a position depicted by solid line in FIG. 5). When the stack receiving block 11 is elevated, the upper surface of bearing ledges 11b is exposed above the transport plane of the belt conveyor 6a (or 6b), so that the ham stack 1 being transported on the round belts 7 is received onto the bearing ledges 11b of the receiving block 11 for being disengaged from the round belts 7, whereby ham stacks 1 are aligned in parallel and caused to dwell on the receiving block 11.

When ham stacks 1 are thus aligned in parallel and caused to dwell on the parallel transport conveyor 6, the air cylinder 15 for unit dwell devices 10 in parallel is controlled to lower the stack receiving blocks 11, whereupon the upper surface of the bearing ledges 11b is retracted to a position below the transport plane of the belt conveyors 6a (or 6b) so that parallel ham stacks 1 on the bearing ledges 11b transfer while held in parallel onto the belt conveyor 6a (or 6b) which is being driven, for being transported forward thereon.

In the present embodiment, the parallel transport conveyor 6 is provided with unit dwell devices 10 having the above described function arranged in two lines at longitudinally spaced nine positions (positions $a_1$ to $a_9$ in FIG. 3) in the direction of transport and between optical sensors 12 of each two adjacent unit dwell devices 10 in the above described spacing relationship. In this parallel transport conveyor 6, only the unit dwell devices 10 disposed at the rearmost $a_9$ position are operative to align ham stacks 1 channelized into right and left lines in parallel. Further, it is arranged that in case no ham stack 1 is present ahead of the $a_8$ position, the two stack-receiving blocks 11 at the $a_9$ position are simultaneously lowered so that parallel ham stacks 1 aligned by the unit dwell device 10 at the $a_9$ position are transported toward a forward position on the parallel transport conveyor 6.

The unit dwell devices 10 are so controlled that parallel ham stacks 1 transported forward on the parallel transport conveyor 6 in this way are sequentially transported to each forward position (position $a_1$ to $a_8$) until they are caused to dwell by a forwardmost vacant unit dwell device 10, so that ham stacks 1 are sequentially caused to dwell at forwardmost position $a_1$ and succeeding positions $a_2$, $a_3$ ... and held in alignment at the respective positions.

In the apparatus of the present embodiment, it is arranged that when ham stacks 1 are aligned in successive positions of up to position $a_8$ in manner as described above, the operation of the slicer 2 is automatically stopped for a while to thereby prevent the trouble of overflowing which may arise as a consequence of ham stacks 1 occupying all positions of up to position $a_9$. When parallel ham stacks 1 have been caused to dwell on the parallel transport conveyor 6 by the unit dwell devices 10 at positions $a_1$ to $a_8$, stack receiving blocks 11 at positions $a_1$ and $a_2$ are first lowered simultaneously in response to a signal from associated equipment installed at a location ahead of the transport path of the conveyor 6, whereupon four ham stacks 1, while held in alignment as in their dwell time, are delivered through a relay conveyor 19 toward article transfer means 20 (see FIGS. 2, 3 and 6) arranged ahead of the transport path of the relay conveyor 19 in accordance with the invention.

In the apparatus for automatically feeding articles in aligned condition to a packaging machine in accordance with the invention, the article transfer means 20 comprise a positioning conveyor 21, a slide conveyor 22, and a loading unit 23 as will be described hereinbelow.

Referring to FIGS. 6 to 11, the positioning conveyor 21 in the present embodiment comprises a comb-like frame 26 having five projecting frames 25 which project in a comb teeth-like fashion from a base frame 24 in the direction of transfer of articles, a driving roller 29 with its shaft 28 rotatably supported by a pair of bearings 27 which is arranged at the rear end of the comb-like frame 26 (see FIGS. 10, 11), a number of rollers 31 rotatably supported on respective shafts 30 mounted to the forward ends of the projecting frames 25 (see FIGS. 8, 9), and a number of round belts 32 trained between the driving roller 29 and the rollers 31, the rear end of the base frame 24 being pivotally supported on a frame 33 of the article transfer means 20 by means of a stepped bolt 35. The rear end of the base frame 24 at one side (left side in FIGS. 10, 11) is pivotally supported on a left member of the frame 33 through a combination of an outer shaft 34 secured to that rear end, a stepped bolt 35 threadedly fitted to the end of the outer shaft 34, and a bracket 36 in which the stepped bolt 35 is rotatably journaled, while the rear end of the base frame 24 at the other side (right side in FIGS. 10, 11) is pivotally supported on a right member of the frame 33 through a combination of a mounting block 37 secured to that rear end, a stepped bolt 38 threadedly fitted to the mounting block 37, and a bracket 39 in which the stepped bolt 38 is rotatably journaled.

Figure 11:
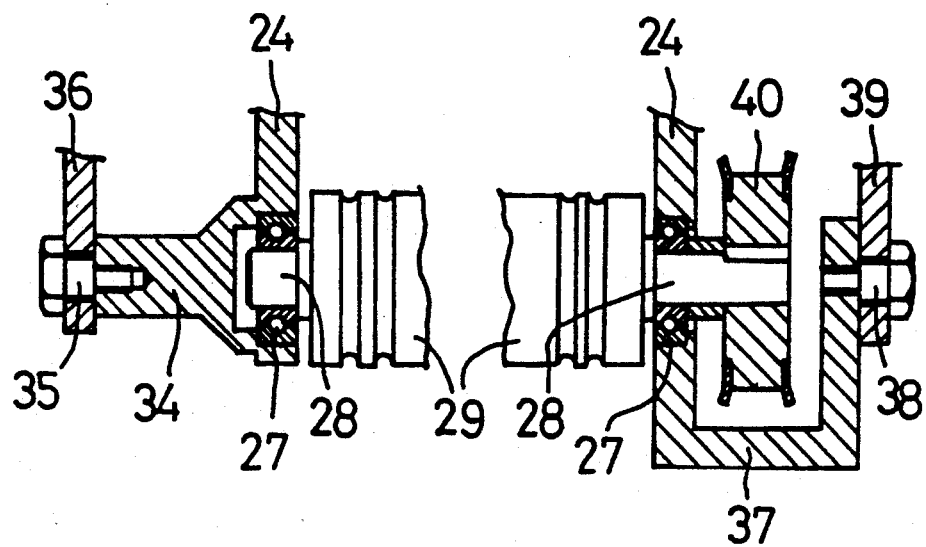
FIG. 11 is a longitudinal sectional rear view (section taken along the line XI—XI in FIG. 8) showing support means for a driving roller of the positioning conveyor.

The stepped bolts 35, 38 are coaxial with the driving roller 29, and the right shaft 28 of the driving roller 29 is fitted with a pulley 40 which is connected to an output shaft of a motor 42 through a belt 41 (FIG. 11).

Figure 6:
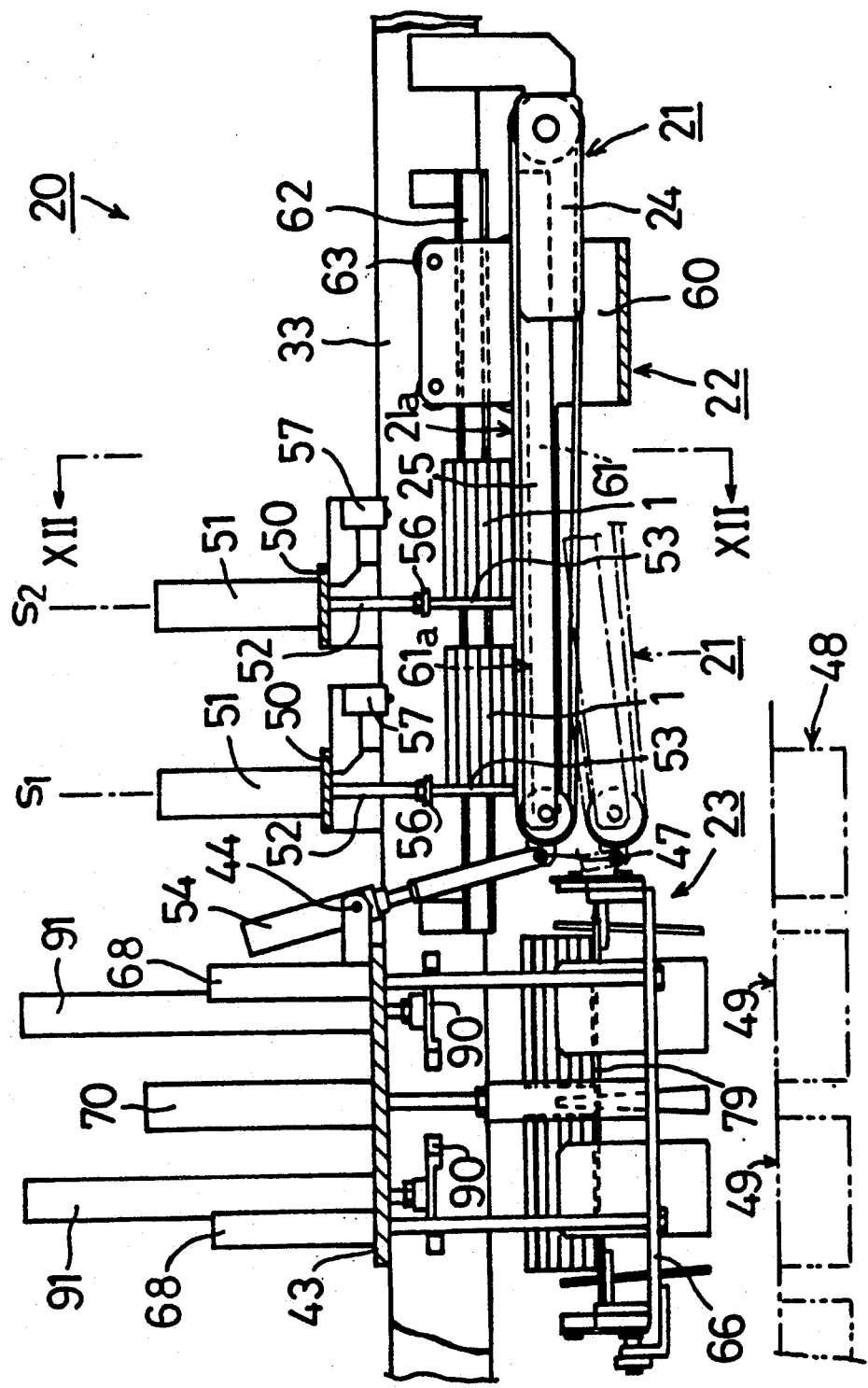
FIG. 6 is a side view of article transfer means.
Figure 7:
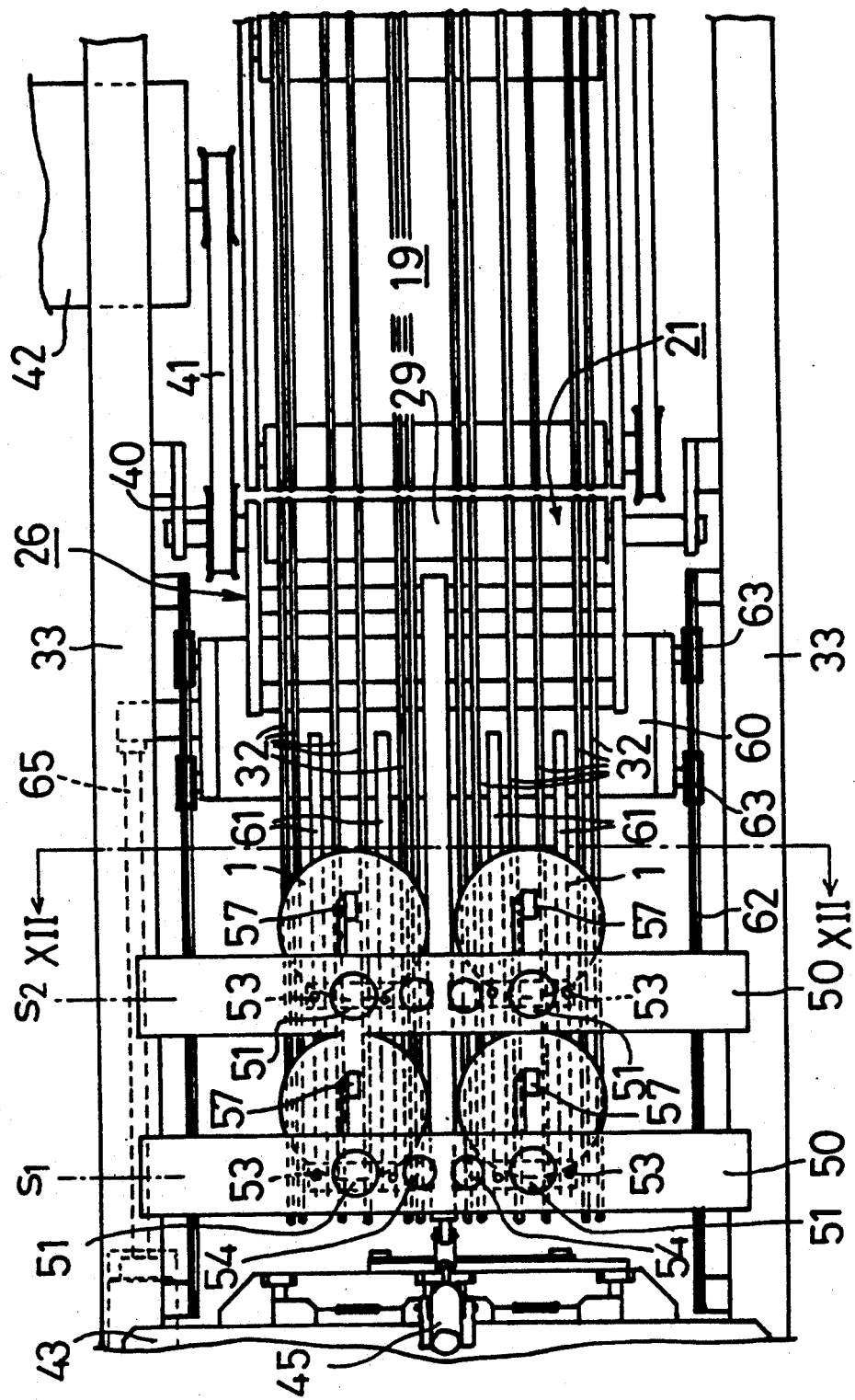
FIG. 7 is a plan view showing a positioning conveyor and a slide conveyor which constitute the first half portion of the article transfer means.
Figure 8:
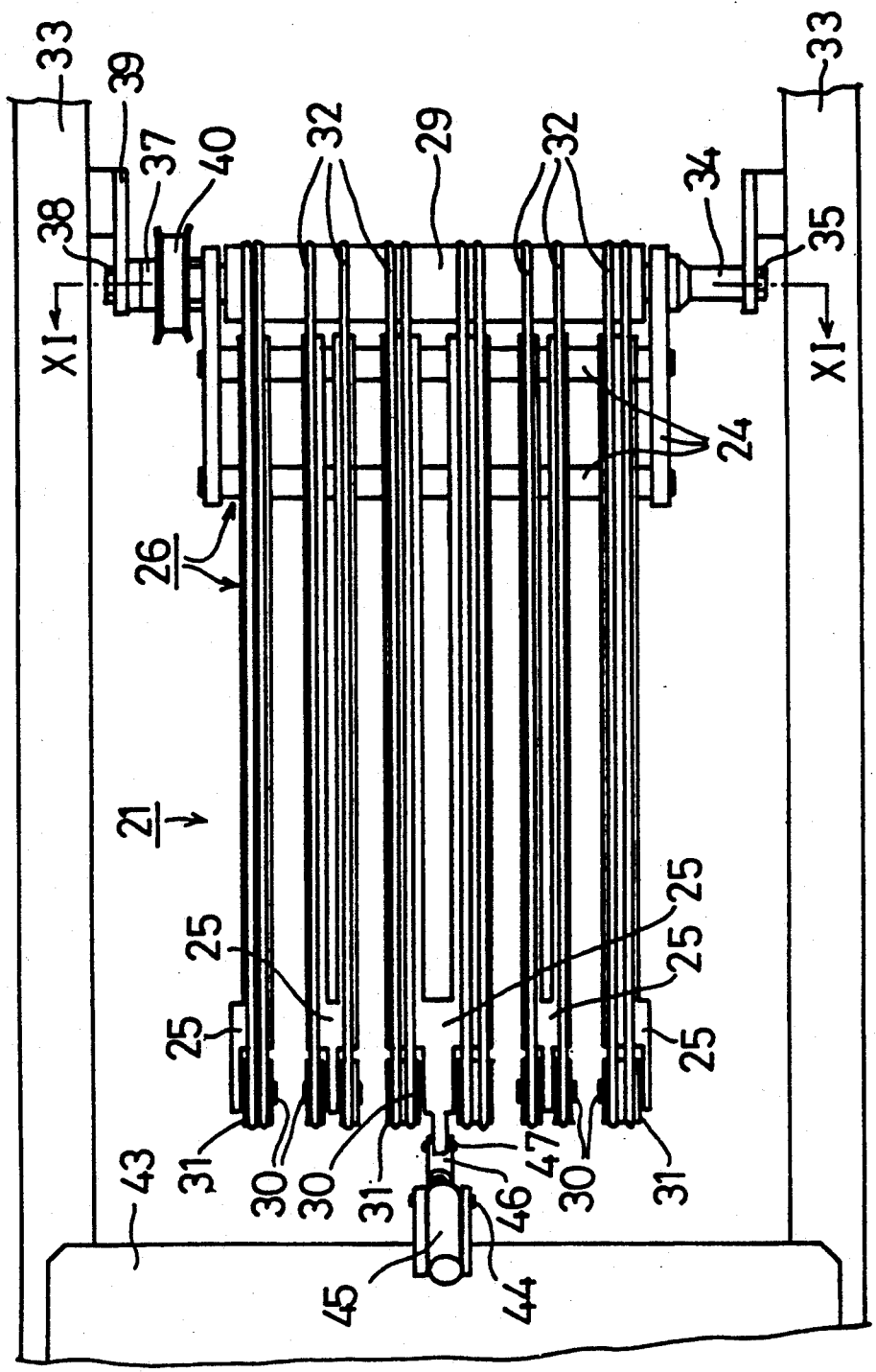
FIG. 8 is a plan view of the positioning conveyor.

The frame 33 includes an upper plate 43 which is located above the ham stack delivery positions 49 at the packaging machine 48 as shown in FIGS. 2 and 6. In the comb-like frame 26 of the positioning frame 21, the forward end of one of the projecting frames 25 which is transversely centrally located is pivotally supported at 47 by a piston rod 46 of an air cylinder 45 pivotally supported at 44 on a rear end portion of the upper plate 43 (FIGS. 8, 9), so that when the air cylinder 45 is driven, the transport plane 21a of the positioning belt conveyor 21 is displaced between an elevated position at which the transport plane 21a is kept horizontal (solid line position in FIG. 9) and a lowered position at which the transport plane 21a is inclined (chain line position in FIG. 9).

Figure 12:
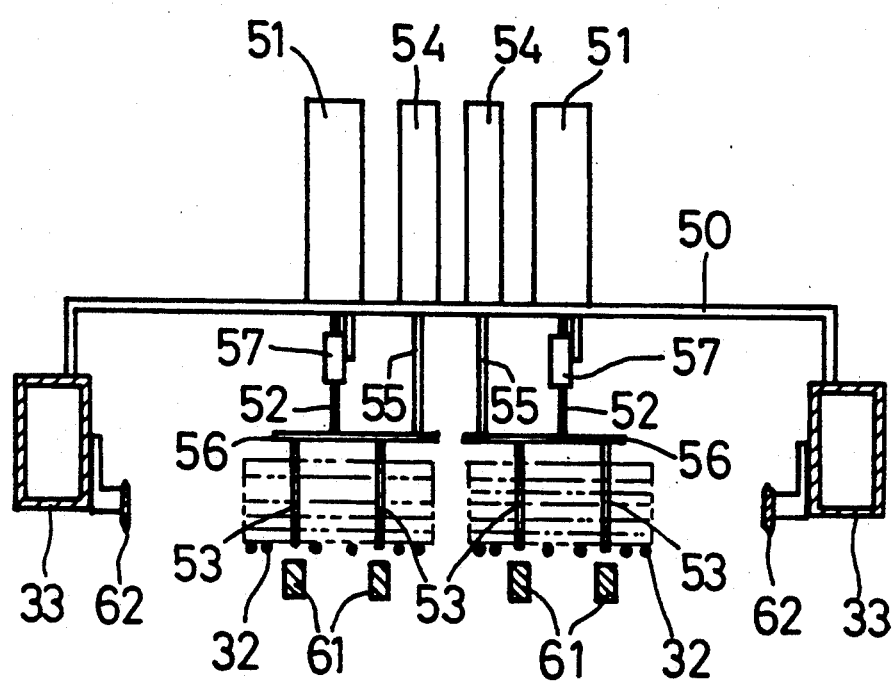
FIG. 12 is a rear view of stoppers (with section taken along the line XII—XII in FIG. 6)
Figure 13:
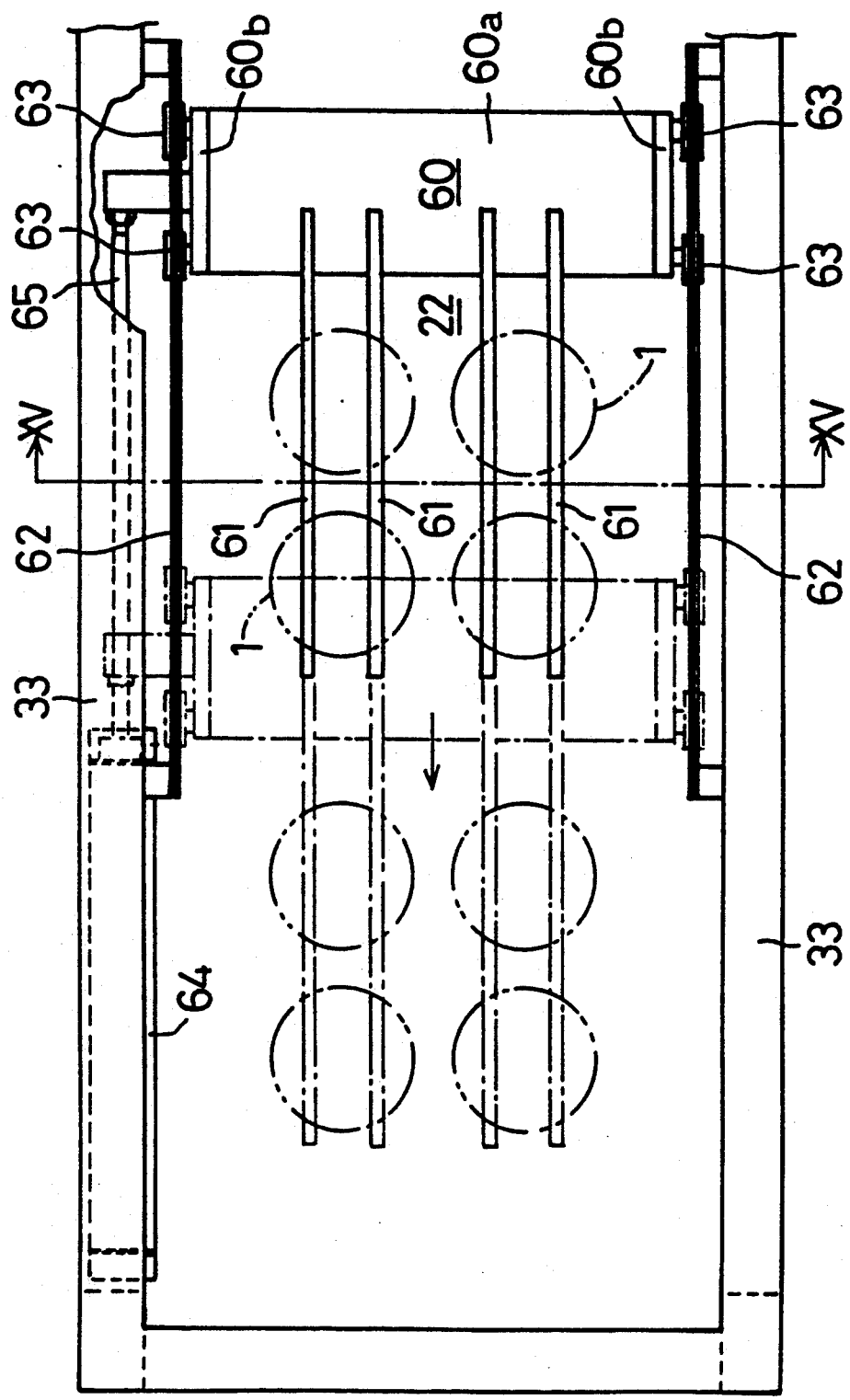
FIG. 13 is a plan view of a slide conveyor.
Figure 14:
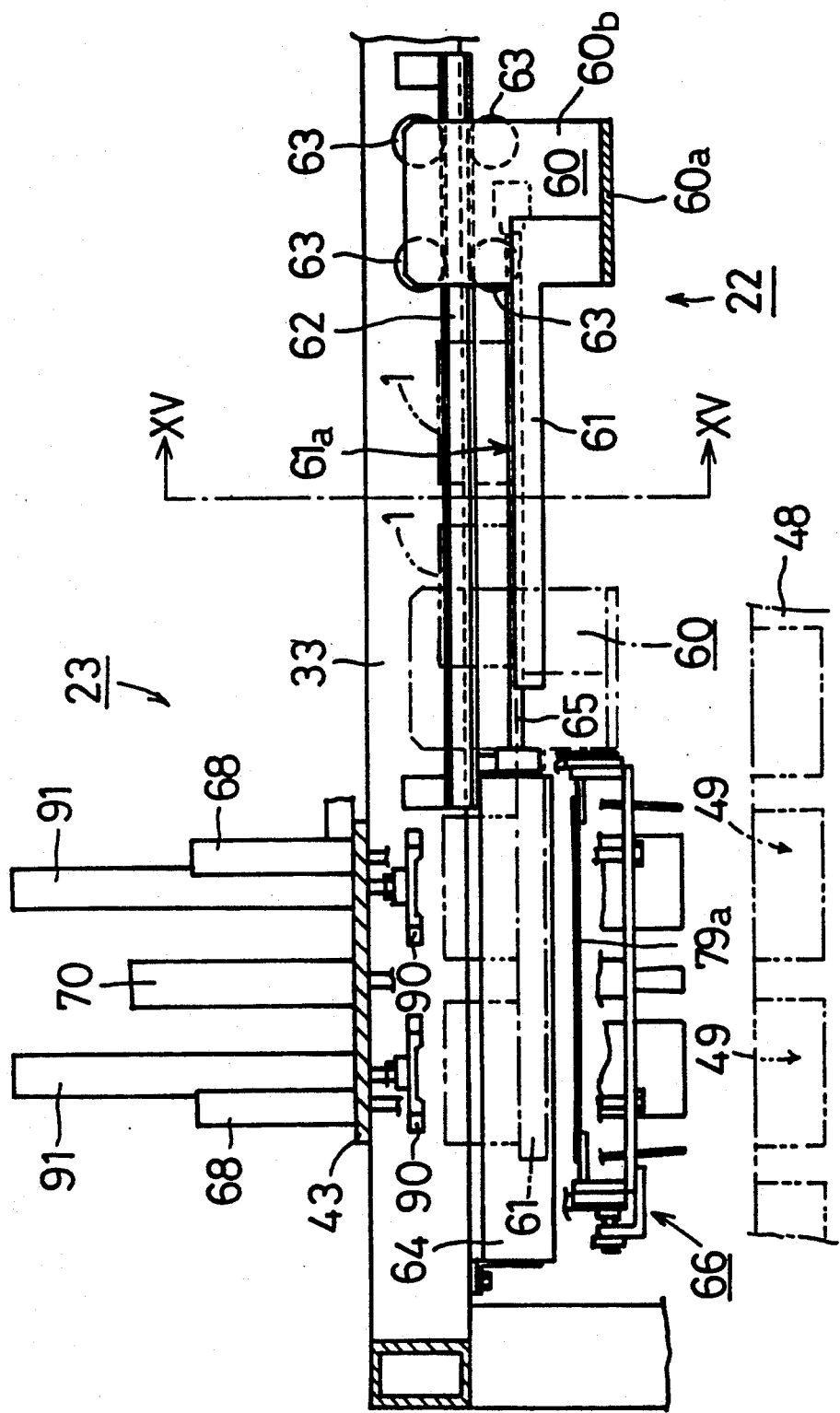
FIG. 14 is a longitudinal sectional side view of the slide conveyor.
Figure 15:
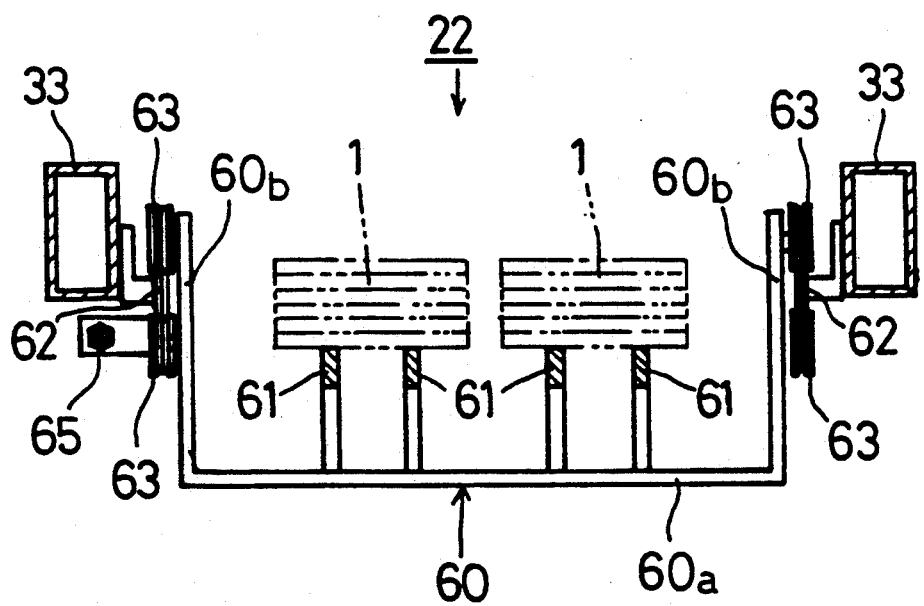
FIG. 15 is a vertical sectional front view (section taken along the line XV—XV in FIG. 14)

Two gantry-shaped brackets 50 are provided above a front portion of the positioning conveyor 21 and between the two frame members 33 at two longitudinally spaced positions ($S_1$, $S_2$) (see FIGS. 6, 7, and 12), with two air cylinders 51 mounted on each gantry-shaped bracket 50 with their piston rods 52 oriented downward. Further, on each gantry-shaped bearing 50 are mounted two guide tubes 54, one for each air cylinder 51, for steadily bracing a stopper 53 to be controlled by the air cylinder 51 which will be described hereinafter, with guide bars 55 oriented downward which are upward and downward movably supported by the guide tubes 54. The two sets of piston rods 52 and guide bars 55, each set consisting of one piston rod 52 and one guide bar 55, are each fitted at the lower end thereof with one stopper mounting plate 56 (two in all). A stopper 53 consisting of a pair of bars is mounted to each mounting plate 56 in such a way that the two bars disposed parallel are spaced from each other in corresponding relation to the distance between each pair of holding bars 61 of a slide conveyor 22 to be described hereinafter, the stopper bars being positioned immediately above the holding bars (FIG. 12).

The length of each stopper is such that when the piston rod 52 is fully stretched, its lower end reaches the transport plane 21a of the positioning conveyor 21 at the elevated position, in the clearance between adjacent round belts 32. The stroke of each piston rod 52 is such that when the piston rod 52 is contracted, the lower end of the stopper 53 is elevated to a level at which it does not act on ham stack 1 on the positioning conveyor 21.

Further, the positions of the stoppers 53 disposed at positions $S_1$ and $S_2$ as aforesaid are such that when the four pairs of stoppers 53 act respectively on four ham stacks 1 being transported on the positioning conveyor 21, the four ham stacks 1 are prevented from being transported further while being held in positional relationship that corresponds to the ham stack delivery positions (pockets) 4 at the packaging machine 48. When transport of the ham stacks 1 is so prevented, the ham stacks 1 are caused to slip on the round belts 32.

On each gantry-shaped bracket 50 is disposed an optical sensor 57 for each air cylinder 51 at position $S_1$, $S_2$ and at a location behind the cylinder as viewed in the direction of run of the positioning conveyor 21. The optical sensors 57 are operative to detect passage therebelow of ham stacks 1 carried on the positioning conveyor 1 and stop of ham stacks 1 below the sensors 57.

Referring to FIGS. 6, 7, and 13 to 15, the slide conveyor 22 comprises a slider body 60 having a groove shaped cross-sectional configuration, and four (two pairs) holding bars 61 which project forward (in the direction of ham stack transport) from a bottom plate portion 60a of the slider body 60, the slider body 60 being back-and-forth movably supported by the frame 33 of the article transfer means 20 at suitable locations so that the bottom plate portion 60a can move along the path of movement of and below the positioning conveyor 21. In the present embodiment, a pair of parallel rails 62 are arranged at opposite sides of the slide conveyor 22 and on the frame 33 of the article transfer means at suitable locations. Opposite side plate portions 60b of the slider body 60 each carry four grooved wheels 63 which are arranged at longitudinally spaced two locations at which one of the rails 62 is contacted by the wheels from vertically opposite sides. The slider body 60 is back-and-forth movably supported on the frame 33 at suitable locations through the pair of rails 62 and four pairs of grooved wheels 63, so that the four (two pairs) holding bars 61 extending forward in fork-like pattern from the slider body 60 along the path of transport can be moved longitudinally of the frame 33 while their upper surface 61a are constantly kept horizontal (even when there occurs any change in the load applied thereon).

To the slider body 60 of the slide conveyor 22 is connected a piston rod 65 of an air cylinder 64 mounted to the frame 33 and extending longitudinally of the frame 33, so that when the air cylinder 64 is driven, the slide conveyor 22 can be moved back and forth between an advance position (shown by chain line in FIGS. 13 and 14) at which the holding bars 61 are positioned immediately above the ham stack delivery positions 49 at the packaging machine, and a retreated position (shown by solid line in FIGS. 6, 7, 13 and 14) at which the holding bars 61 overlap a front portion of the positioning conveyor 21. The four holding bars 61 are positioned in comb-like interteeth clearances of the projecting frames 25 of the positioning conveyor 21 at the retreated position at which they overlap the positioning conveyor 21. The holding bars 61 are attached at their base to the slider body 60 at such a location and at such a level that at the retreated position, the upper surface 61a of each holding bar 61 is slightly lower than the transport plane 21a of the positioning conveyor 21 at the elevated position (shown by solid line in FIGS. 6 and 9).

Figure 9:
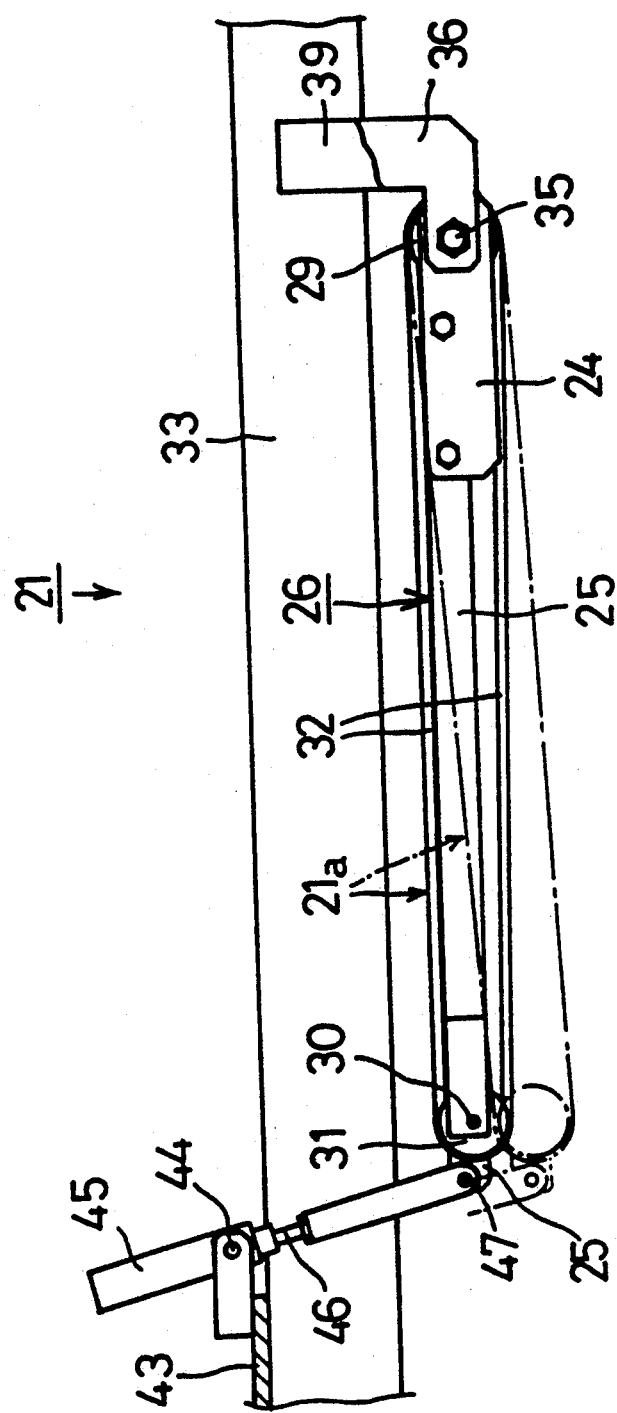
FIG. 9 is a side view of the positioning conveyor.
Figure 10:
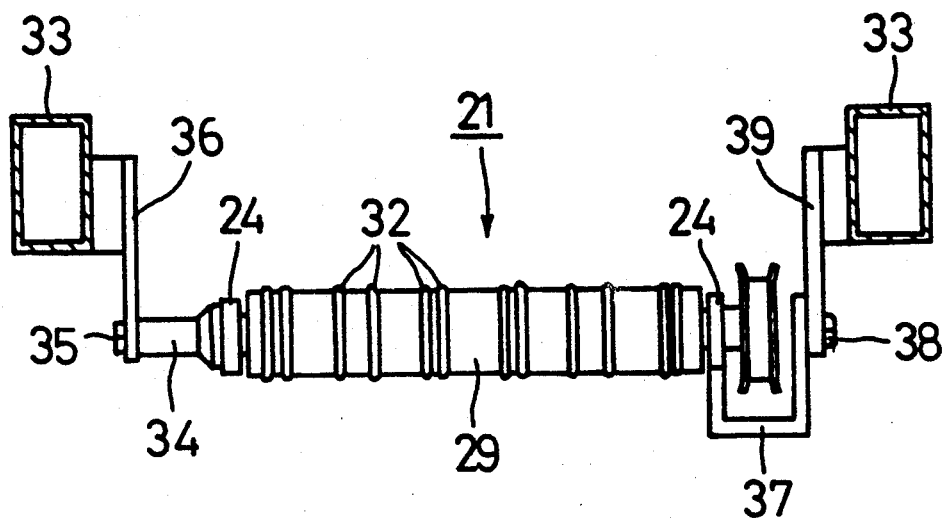
FIG. 10 is a rear view (taken on the line X—X in FIG. 8) of the positioning conveyor.

Therefore, when the positioning conveyor 21 is lowered to the position shown by chain line in FIGS. 6 and 9 in such a condition that the four holding bars 61 of the slide conveyor 22 overlap the front portion of the positioning conveyor 21, the upper surface 61a of the holding bars 61 is exposed relatively above the transport plane 21a of the positioning conveyor 21 (FIG. 24), and when the positioning conveyor 2 is elevated, the upper surface 61a of the holding bars 61 is retracted relatively below the transport plane 21a (FIGS. 6 and 12).Therefore, with the positioning conveyor 21 kept at the elevated position, ham stacks 1 are transported on the positioning conveyor 21 and to the predetermined transfer position above the holding bars 61 of the slide conveyor 22, then the positioning conveyor 21 is stopped and the transport plane 21a of the positioning conveyor 21 is lowered, whereby the ham stacks 1 on the positioning conveyor 21 can be transferred, while held in alignment, onto the pairs of holding bars 61. Subsequently, the slide conveyor 22 is advanced for transport of the ham stacks resting on the holding bars 61 of the slide conveyor 22 to the loading means 23 positioned ahead of the positioning conveyor 21.

Referring to FIGS. 6, 14, and 16 to 20, the loading means 23 comprise an elevating frame 66 vertically movably supported on the aforementioned upper plate 43 which is mounted on the frame 33 at a location above the ham delivery positions at the packaging machine, and four pivot shutters 79a, 79b, 79c, 79d attached to the elevating frame 66, the loading means 23 being so located as to overlap the advanced position of the holding bars 61.

The elevating plate 66 is vertically movably supported by four air cylinders 68 mounted to the upper plate 43 at suitable locations thereon, with their respective piston rods 69 oriented downward. On the upper surface of the upper plate 43 at suitable locations are mounted two guide tubes 70 for moving the elevating frame 66 upward and downward while allowing them to be constantly kept level, with a guide bar 71 slidably received in each of the guide tubes 70, the guide bar 71 being oriented downward. The lower end of each guide bar 71 is secured to the top end of a connecting rod 72 mounted upright on the elevating frame 66.

The elevating frame 66 is formed with four square holes 73 which are positioned immediately above the ham stack delivery positions 49 at the packaging machine 48. At respective hole sites and centrally along their four sides there are provided guide plates 74 for abutment with sides of ham stacks 1 dropping through the square holes 73.

Figure 17:
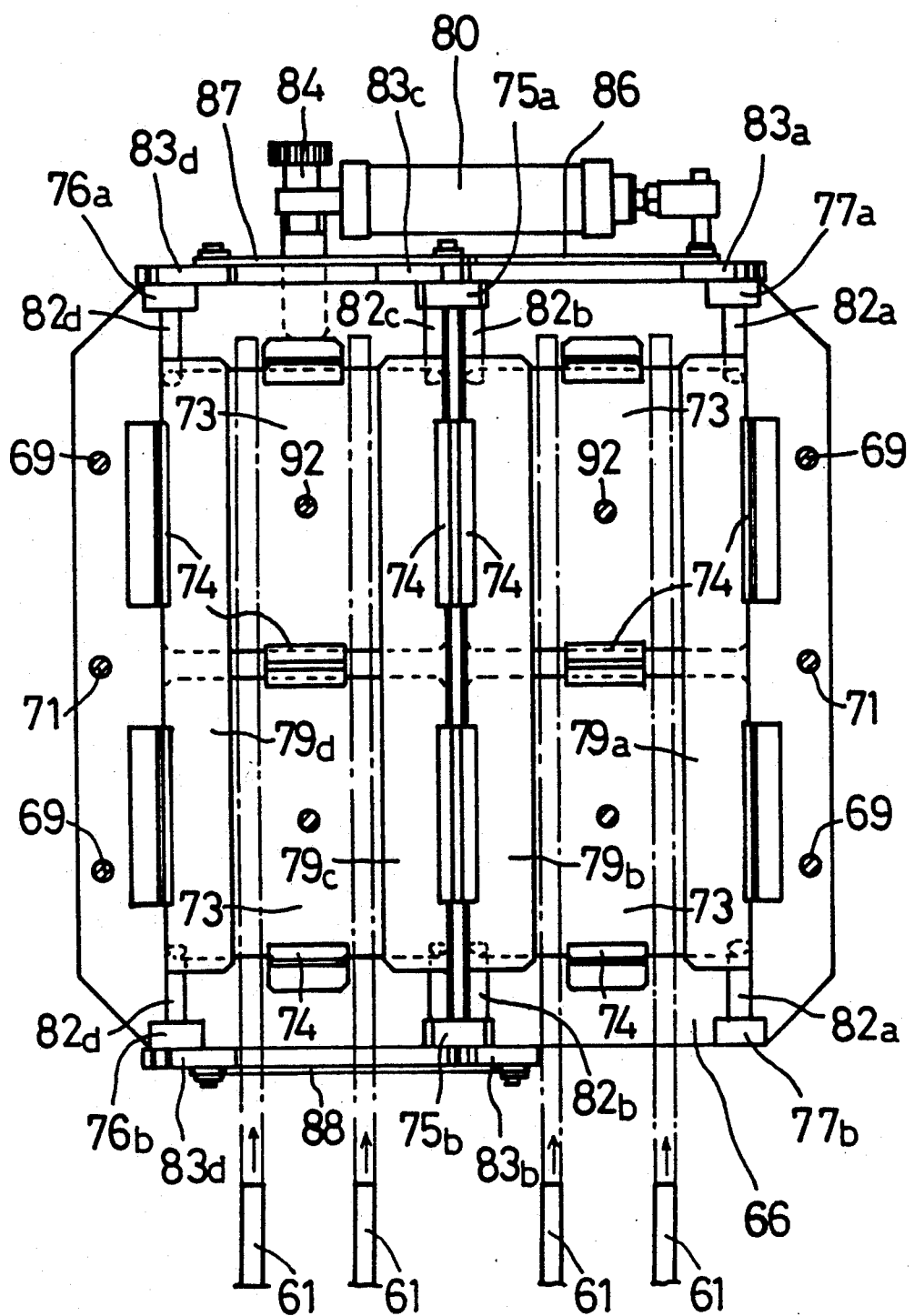
FIG. 17 is a plan view of an elevating frame (with section taken along the line XVII—XVII in FIG. 20)

The elevating frame 66 is also provided, at its front and rear ends (as viewed from the directions of back and forth movement of the slide conveyor 22), with three pairs of bearing plates 75a, 75b; 76a, 76b; 77a, 77b, one pair each at three lateral positions (right, middle and left) for each end side (FIG. 17). Above the elevating frame 66 there are provided four (2 pairs) pivot shutters 79a, 79b, 79c, 79d at positions such that they partially close the square holes 73 from opposite sides, with their respective shafts 82a, 82b, 82c, 82d rotatably supported by the bearing plates 75a, 75b; 76a, 76b, 77a, 77b at suitable sites thereof. Respective pairs of pivot shutters 79a, 79b; 79c, 79d are spaced apart from each other so that at least when the pivot shutters are kept in their closed position (horizontal position) and when the pairs of holding bars 61 of the slide conveyor 22 are positioned at the advanced position (chain line position in FIG. 7), the elevating frame 66 can be vertically moved without causing the pivot shutters to contact the holding bars 61. The stroke of the air cylinder 68 is of a length such that the elevation of the elevating frame 66 is stopped when the elevating frame 66 is elevated by the air cylinder 68 to its most elevated position at which the upper surface 66a of the elevating frame 66 is most close to the holding bars 61 of the slide conveyor 22 controlled to its advanced position so that the upper surface of the pivot shutters 79 is slightly higher than the upper surface 61a of the holding bars 61 (FIG. 19), while when the elevating frame 66 is lowered by the air cylinder 68 to its most lowered position, the lower end of the guide plates 74 attached to the elevating frame 66 stops at a position most close to the ham stack delivery positions 49 at the packaging machine 48 (FIG. 20).

Figure 19:
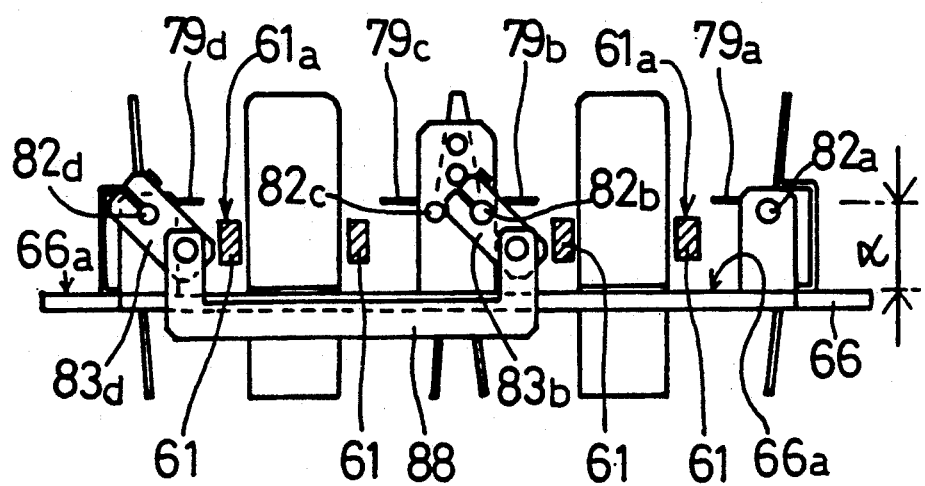
FIG. 19 is a rear view of the elevating frame.

The respective pivot shutters 79a, 79b, 79c, 79d are spaced apart from the upper surface 66a of the elevating frame 66 by a certain distance a such that when the pivot shutters are turned more than 90 degrees downward from its closed position (horizontal position) toward its opend position, the leading edge of each pivot shutter will not contact the surface of the upper surface 66a of the elevating frame 66 and such that, as already stated, when the elevating frame 66 is elevated to its most elevated position, the upper surface of each pivot shutter 79a 79b, 79c, 79d at the closed position (horizontal position) is slightly higher than the upper surface 61a of holding bars 61 of the slide conveyor 22 (FIG. 19).

In the present embodiment, for turning the four (two pairs) pivot shutters 79a, 79b; 79c, 79d simultaneously between the closed position (horizontal position) and the opened position (a position to which a downward turn of more than 90 degrees is made relative to the closed position), a rotation drive mechanism as described hereinbelow is connected to the pivot shutters.

Figure 16:
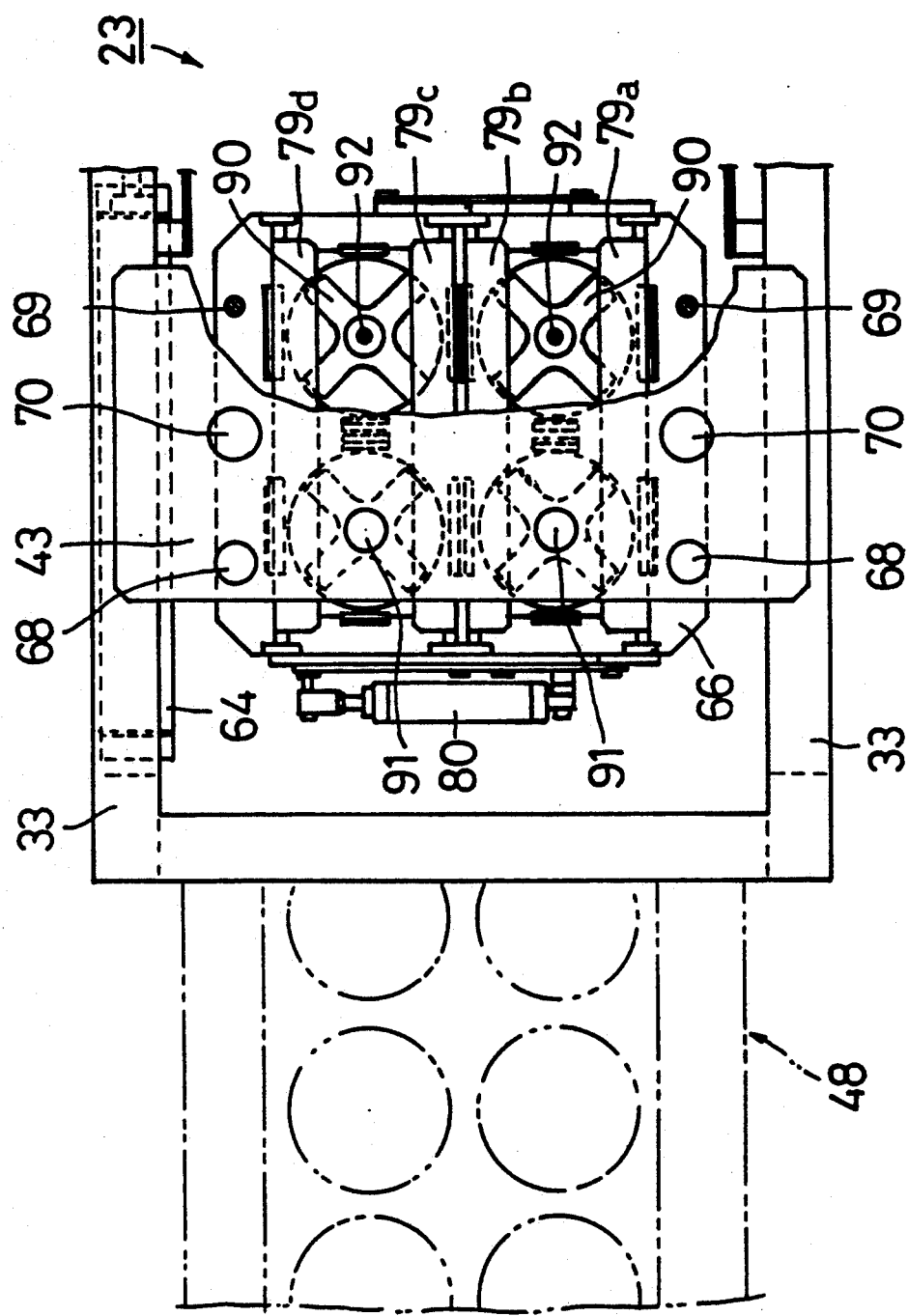
FIG. 16 is a partially cut-away plan view showing loading means which constitute the latter half portion of the article transfer means.
Figure 18:
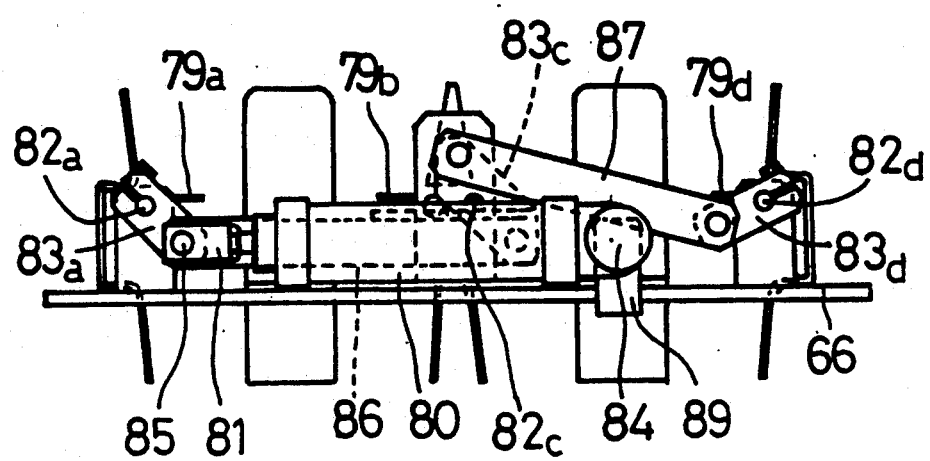
FIG. 18 is a front view of the elevating frame.
Figure 20:
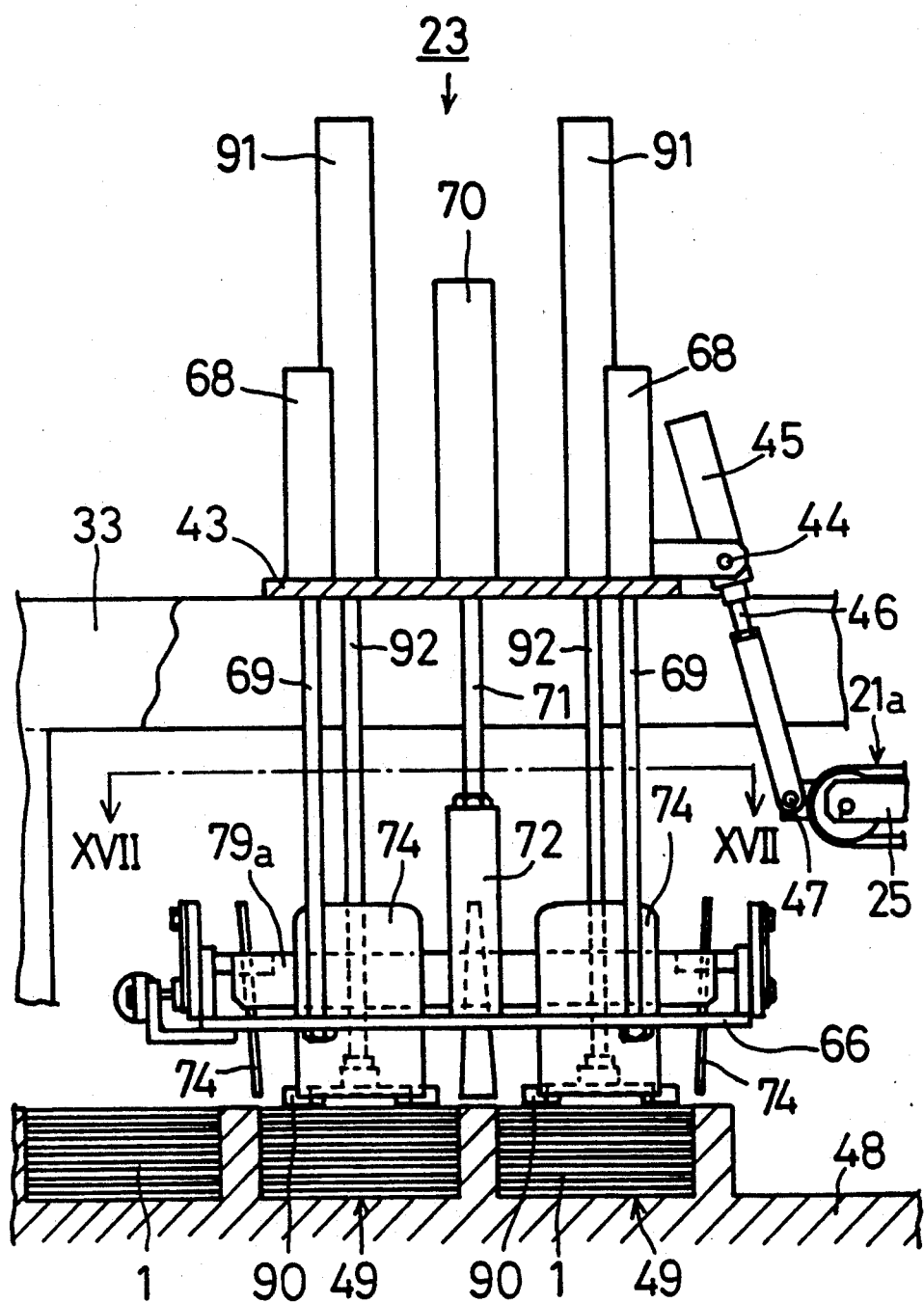
FIG. 20 is a side view of the elevating frame.
Figure 21:
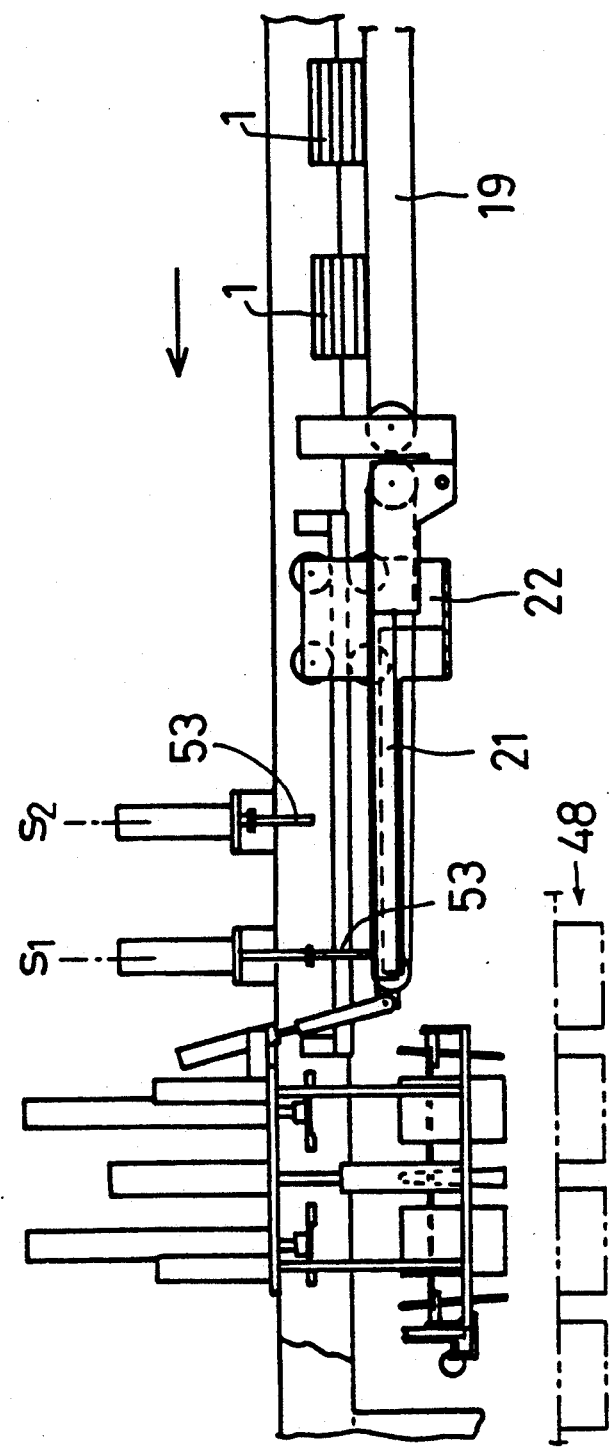
FIG. 21 is a side view of the article transfer means as viewed at a point of time immediately prior to the delivery of articles, when the front side stopper is lowered to its operative position and the slide conveyor is on standby at its rearmost position, the positioning conveyor being in operation at its elevated position.

As FIGS. 16 to 19 show, an air cylinder 80 pin-connected at 84 to the elevating frame 66 through a bracket 89 has a piston rod 81 whose front end is pin-connected at 85 to a free end of a lever 83a mounted to a shaft 82a of the pivot shutter 79a, so that when the air cylinder is stretched or contracted, the pivot shutter 79a is turned more than 90 degrees between the closed position (horizontal position as shown in FIGS. 16 to 18) and the open position (as shown in FIG. 20).

The shaft 82a of the pivot shutter 79a and a shaft 82c of the pivot shutter 79c are interconnected by a horizontal link 86 via free ends of parallel levers 83a, 83c mounted respectively to the shafts 82a, 82c (FIG. 18), so that when the pivot shutter 79a is pivoted in the direction of shutter opening, the pivot shutter 79c is pivoted the same angular distance in the same direction (opening direction).

The shaft 82c of the pivot shutter 79c and a shaft 82d of the pivot shutter 79d are interconnected by an inclined link 87 via an opposite side free end of the lever 83c and a free end of a lever 83d mounted to a shaft 82d of the pivot shutter 79d, so that when the pivot shutter 79c is pivoted codirectionally with the pivot shutter 79a, the pivot shutter 79d is pivoted the same angular distance in the opposite direction (opening direction). (FIG. 18).

The shaft 82d of the pivot shutter 79d and a shaft 82b of the pivot shutter 79b are interconnected by a horizontal link 88 via free ends of parallel levers 83d, 83b mounted respectively to the shafts 82d, 82b as shown in FIG. 19, so that when the pivot shutter 79d is pivoted in the direction of shutter opening, the pivot shutter 79b is pivoted the same angular distance in the same direction (opening direction).

Therefore, by operating the air cylinder 80 it is possible to pivot the four (two pairs) pivot shutters 79a, 79b; 79c, 79d between the closed position at which each pair of pivot shutters 79a, 79b; 79c, 79d, positioned above the respective square holes 73 formed in the elevating frame 66, partially close the square holes 73 from laterally opposite sides, and the open position at which the pivot shutters do not close the square holes 73. Thus, after ham stacks 1 are set in position on the pairs of pivot shutters 79a, 79b; 79c, 79d at the closed position, the pivot shutters may be simultaneously opened, and the ham stacks 1 on the shutters are allowed to drop in concert to be received into the corresponding delivery positions (pockets) immediately below the shutters.

In the present embodiment, the loading means 23 include pusher plates 90 arranged immediately above the ham stack delivery positions 49 at the packaging machine 48, which will be described below (FIGS. 6, 14,16, 20). On the upper surface of the upper plate 43 are mounted air cylinders 91 with piston rods 92 oriented downward. The pusher plates 90 are attached to lower ends of the piston rods 92. The air cylinders 91 have a stroke sufficient to move the respective pusher plates upward and downward between an elevated position at which the pusher plates do not contact the upper surface of ham stacks 1 on the pivot shutters 79a-79d of the elevating frame 66 at the most elevated position (FIGS. 6, 14) and a lowered position at which the pusher plates apply pressure on the top of ham stacks 1 supplied to the delivery positions 49 at the packaging machine 48 (FIG. 20). Each pusher plate 90 has a surface configuration or size such that when elevated and lowered, it can pass through the corresponding square hole 73 of the elevating frame 66 while assuming such a horizontal posture as shown in FIGS. 6 and 20 (e. g., a surface size slightly smaller than ham stack 1).

The packaging machine 48 referred to herein is a deep draw vacuum packaging machine such that at the ham stack delivery positions 49 there are formed pairs of pockets, each pocket capable of receiving one ham stack 1, longitudinally arranged in two parallel lines. These pockets are fitted with a series of formed film and are adapted to be intermittently moved by units of four.

The center-to-center pitch of square holes 73 in the elevating frame 66, the center-to-center pitch of the pusher plates 90, the pitch between ham stacks 1 positioned and caused to dwell on the positioning conveyor 21, and the pitch between ham stacks 1 caused to dwell in alignment on the parallel transport conveyor 6, are all determined on the basis of the pocket-to-pocket pitch at the ham stack delivery positions 49; and all operating signals for the elevating frame 66 in the loading means 23, for the slide conveyor 22, for the positioning conveyor 21, and for the relay conveyor 19, are given on the basis of film feed signal in the packaging machine.

Nextly, the method of feeding ham stacks 1 using the article transfer means of the present embodiment will be described in sequential order with reference to FIGS. 21 through 30.

As an aligned set of four ham stacks 1 enters on the relay conveyor 19 which is in rotation, they are transported forward while held in alignment for transfer onto the positioning conveyor 21 which is in rotation. At this point of time, the positioning conveyor 21 is at its elevated position and stoppers 53 at $S_1$ position have been lowered to their operative position. ( FIG. 21 )

Figure 22:
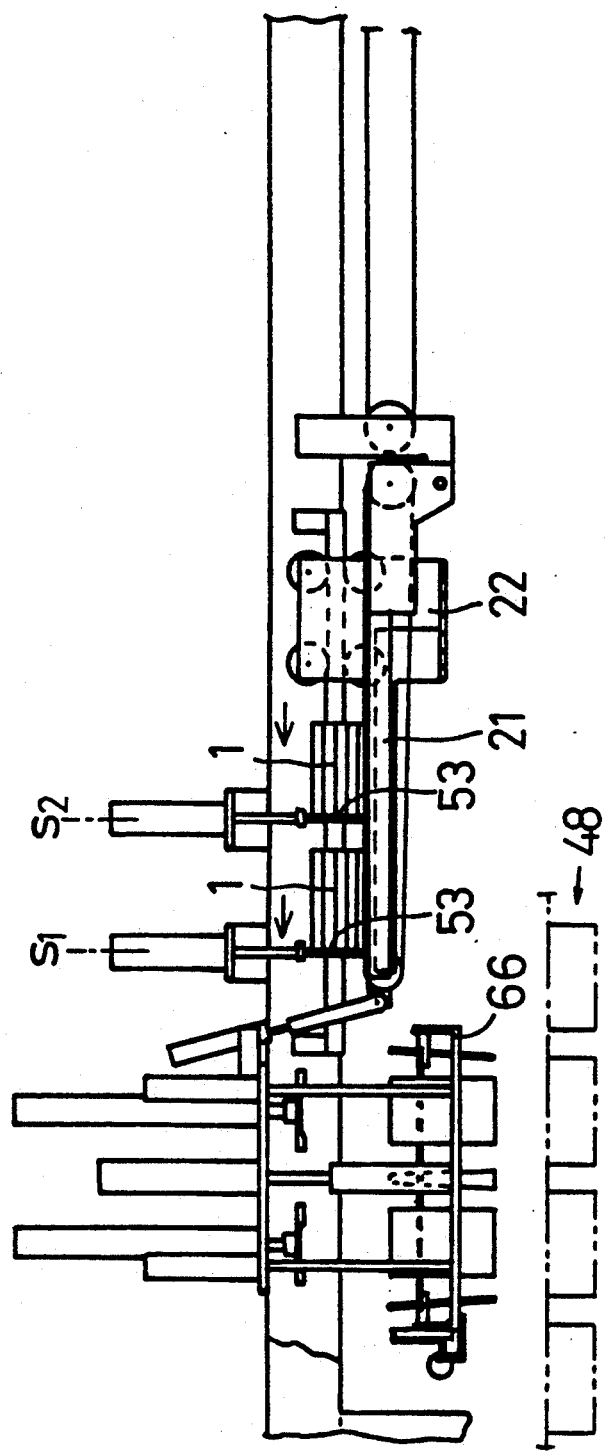
FIG. 22 is a side view of the article transfer means as seen when articles are being positioned by the positioning conveyor.

Ham stacks 1 delivered onto the positioning conveyor 21 which is in rotation are sequentially positioned by stoppers 53 at $S_1$ and $S_2$ positions on the positioning conveyor 21 and brought to a halt for a while. By this time the ham stacks 1 have slipped on the positioning conveyor 21. (FIG. 22)

Figure 23:
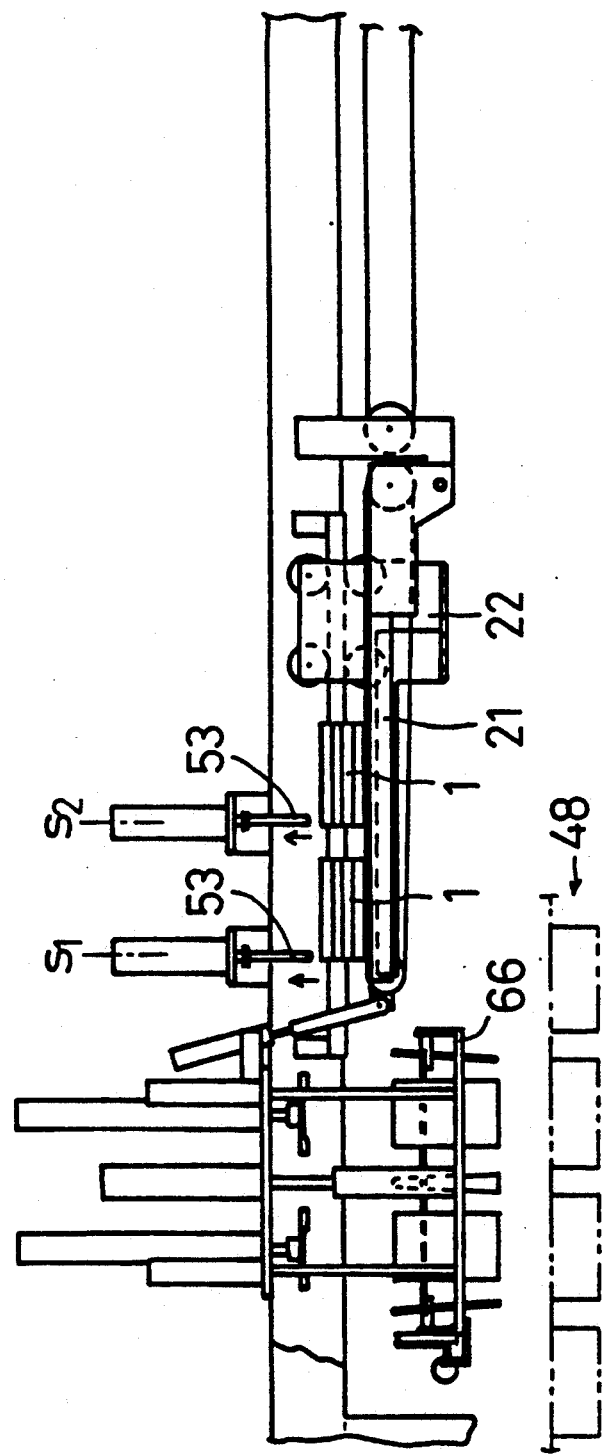
FIG. 23 is a side view of the article transfer means as seen when the positioning conveyor is brought to a halt and the stoppers are elevated.

The rotation of the positioning conveyor 21 is stopped. Stoppers 53 are elevated. Ham stacks 1 already rest on the positioning conveyor 21 as positioned thereon. By this time the slide conveyor 22 is already on standby at its retreated position. (FIG. 23)

Figure 24:
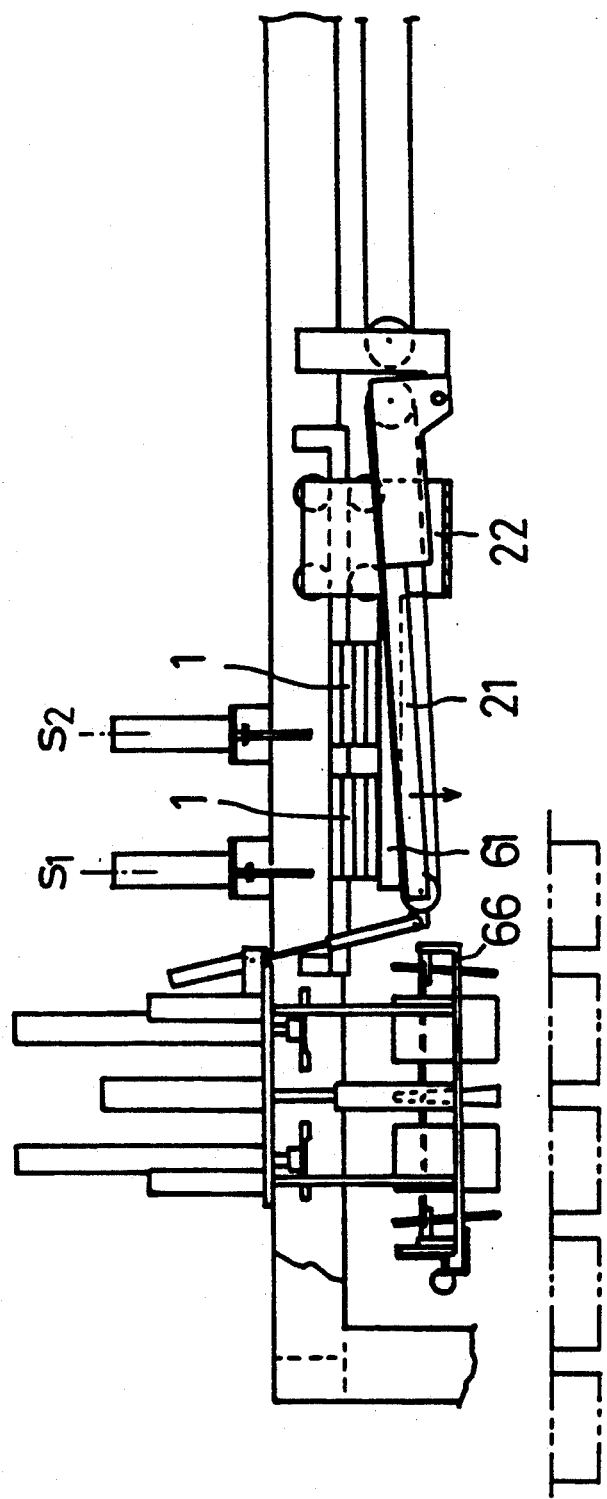
FIG. 24 is a side view of the article transfer means as seen when the positioning conveyor is lowered.

The positioning conveyor 21 is lowered, and ham stacks 1 transfer, while held in alignment, onto holding bars 61 of the slide conveyor 22 at the retreated position. By this time the elevating frame 66 is already on standby at a slightly lowered position. (FIG. 24)

Figure 25:
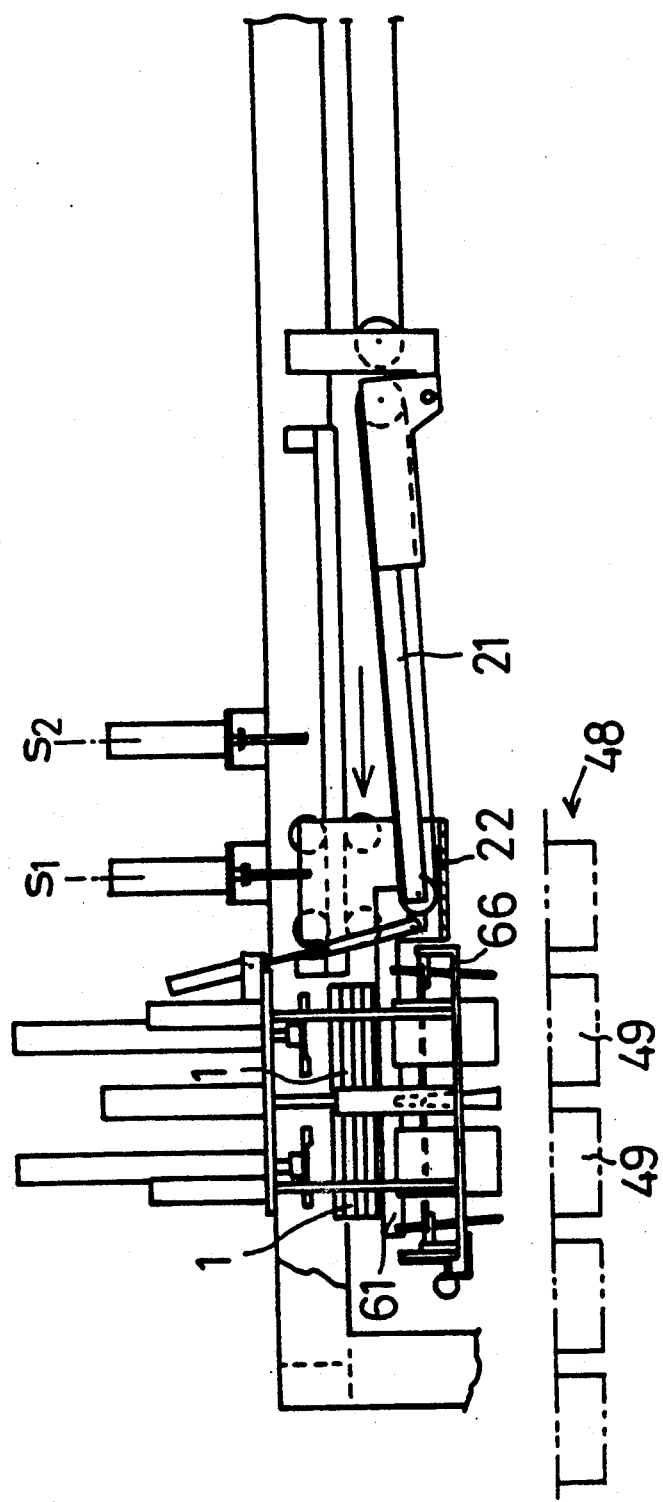
FIG. 25 is a side view of the article transfer means as seen when the slide conveyor has advanced to its most advanced position.

The slide conveyor 22 is advanced while the elevating frame 66 is kept on the standby position. Ham stacks 1 on the holding bars 61 are then brought to a position above the elevating frame 66. The slide conveyor 22 is stopped at its most advanced position, and ham stacks 1 on the holding bars 61 are positioned immediately above the ham stack delivery positions 49 at the packaging machine 48. (FIG. 25)

Figure 26:
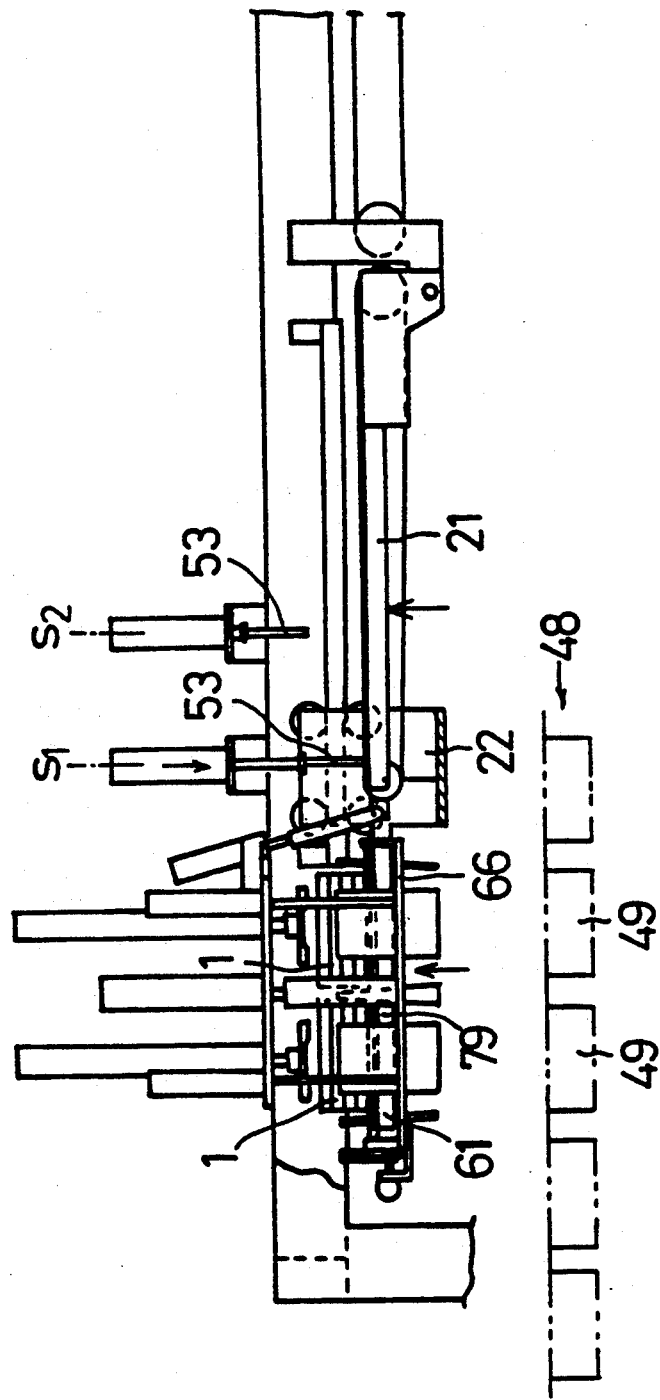
FIG. 26 is a side view of the article transfer means as seen when the elevating frame is elevated to its topmost position and the front side stopper is lowered to its operative position.

When the slide conveyor 22 stops at its most advanced position, the elevating frame 66 is elevated and the ham stacks 1 on the holding bars 61 are received, while held in alignment, onto pivot shutters 79. At this point of time, stoppers 53 at $S_1$ position are lowered and the positioning conveyor 21 is elevated to prepare for a next cycle of feed operation. (FIG. 26)

Figure 27:
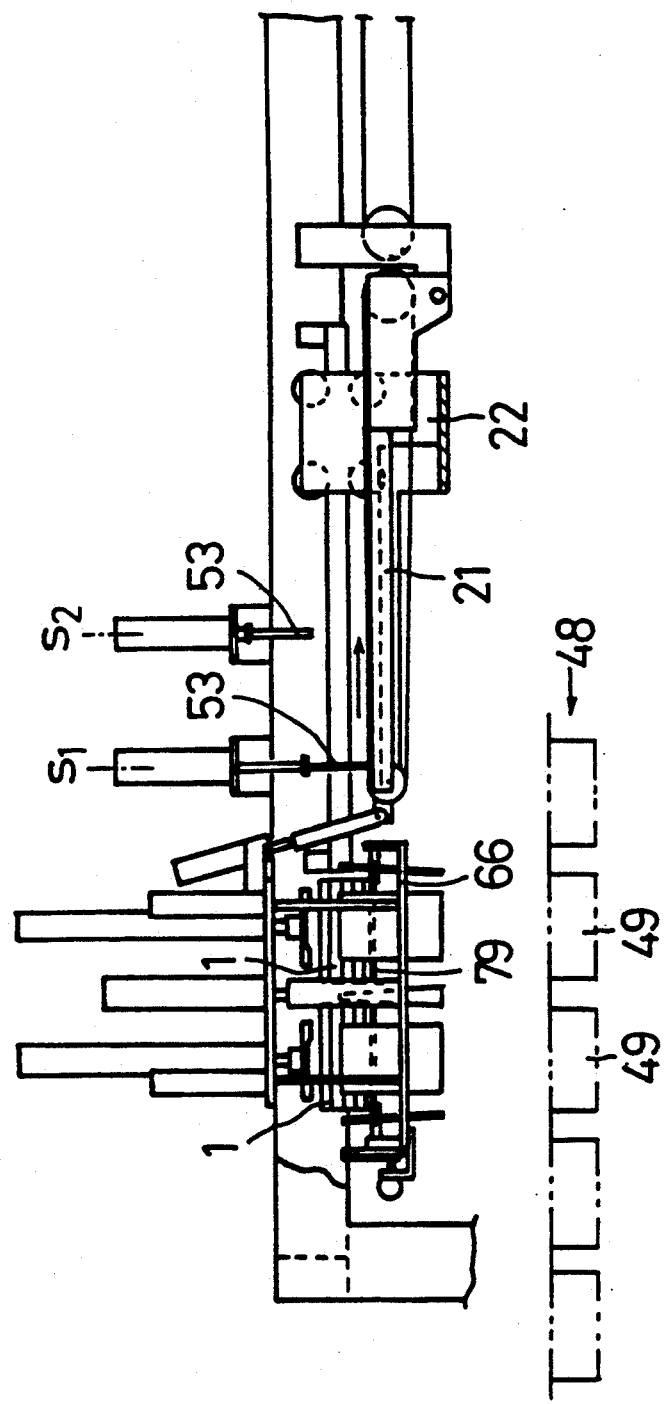
FIG. 27 is a side view showing the article transfer means as seen when the slide conveyor has moved back to its retreated position.

While ham stacks 1 rest on pivot shutters 79, the slide conveyor 22 is retreated and the positioning conveyor 21 is driven into operation. (FIG. 27)

Figure 28:
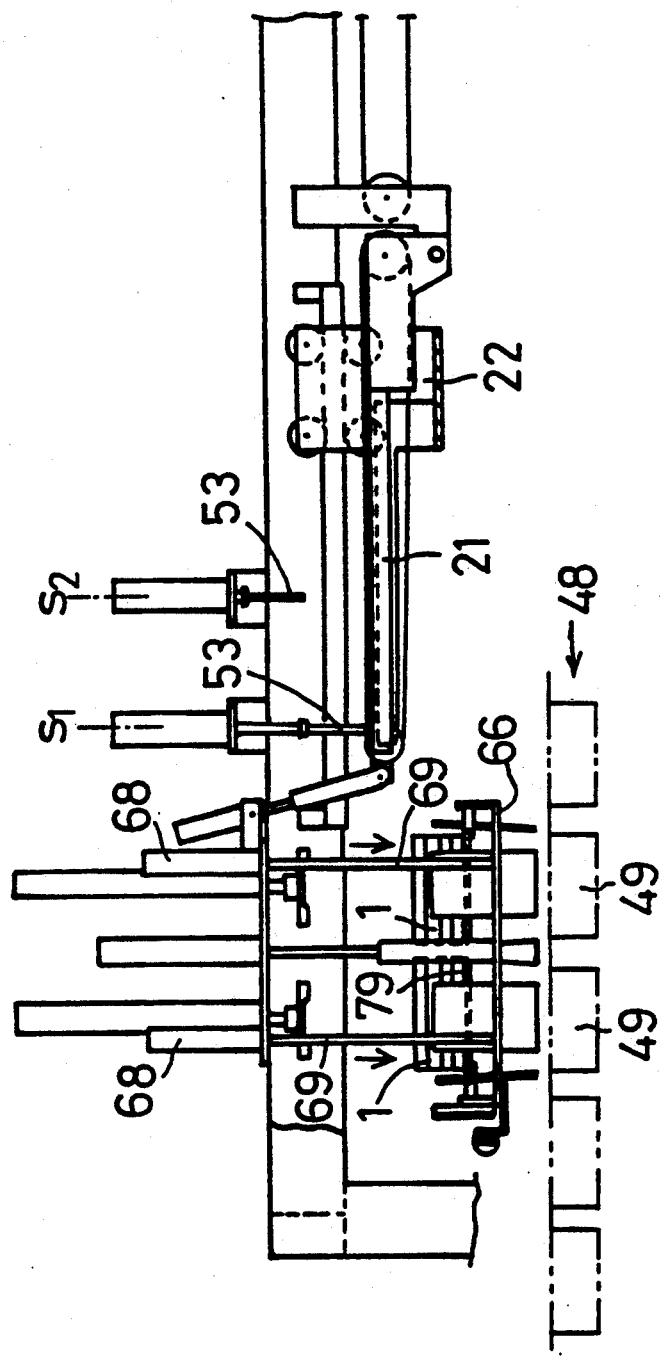
FIG. 28 is a side view of the article transfer means as seen when the elevating frame has been lowered to its lowermost position.

The elevating frame 66 is lowered to the position for loading of ham stacks 1 (most lowered position). (FIG. 28)

Figure 29:
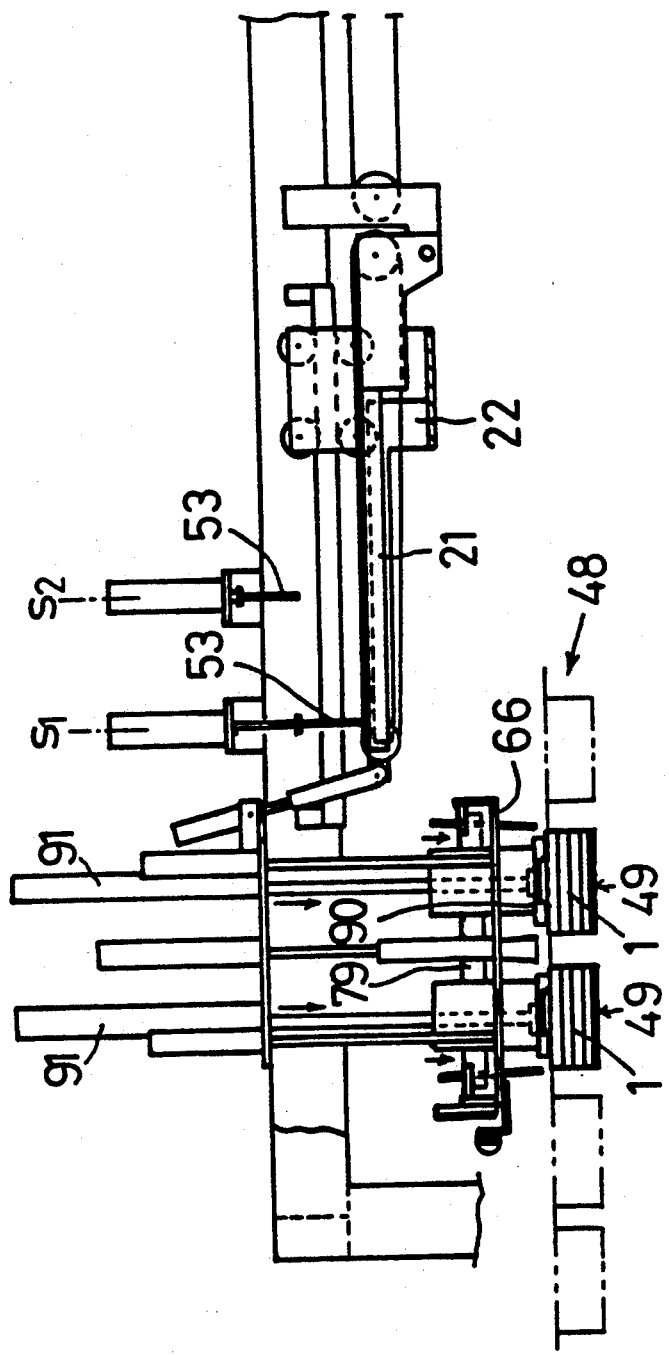
FIG. 29 is a side view of the article transfer means as seen when pivot shutters are opened to allow articles to drop and pusher plates have acted to push the articles toward the article delivery positions.

Pivot shutters 79 of the elevating frame 66 are opened simultaneously, and ham stacks 1 drop into the ham stack deliverey positions 49 (formed film pockets) at the packaging machine 48. In succession to this operation, pusher plates 90 which have been on standby at their most elevated position are lowered, whereupon the ham stacks 1 supplied into formed film pockets at the ham stack delivery positions 49 are positively forced into the film pockets. (FIG. 29)

Figure 30:
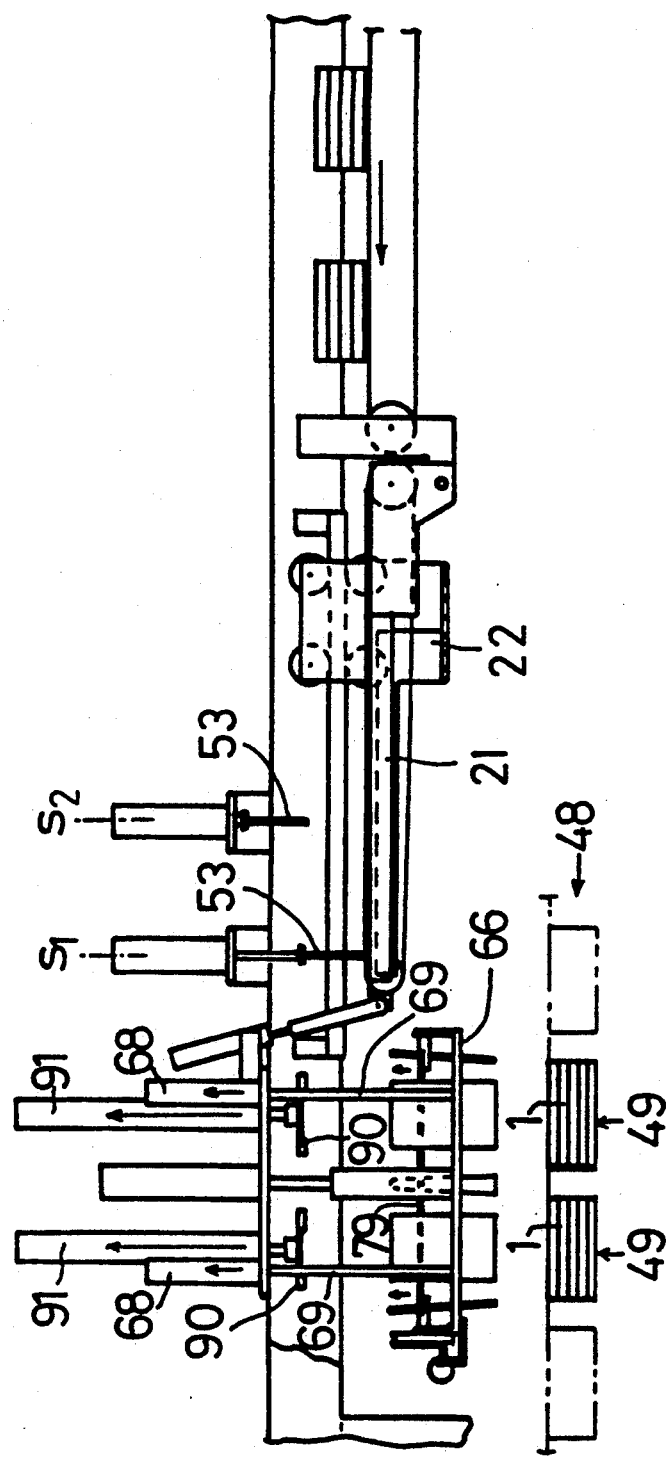
FIG. 30 is a side view of the article transfer means as seen when the elevating plate and pusher plates have been elevated to their respective standby positions.

Thus, as a result of the above described series of operation, ham stacks 1 are received into the ham stack deliverey position 49 (formed film pockets) of the packaging machine 48. Then, the elevating frame 66 is elevated for return to its standby position. At this time, the pusher plates 90 are elevated for standby at their most elevated position. (FIG. 30)

As stated above, in the method and apparatus for automatic supply of articles to the packaging machine according to the invention, all operating stages and components for transfer of articles aligned on the parallel transport conveyor toward article delivery positions by units of a required number each do not involve the use of elements such as catcher pawls which involve clamping articles from laterally opposite sides. More specifically, according to the method and arrangement, articles on the parallel transport conveyor are first transferred onto the positioning conveyor; the articles on the positioning conveyor are then transferred, while being positioned, onto respective upper surfaces of holding bars of the slide conveyor which are exposed slightly above the transport plane of the positioning conveyor through comb-like interteeth clearances of the positioning conveyor when the transport plane of the positioning conveyor is lowered; then, the slide conveyor is advanced to move the articles resting on the holding bars to a location immediately above the article delivery positions at the packaging machine; and for supplying the articles into the delivery positions, the elevating frame is once subjected to slight vertical movement thereby to transfer the articles onto respective upper surfaces of the pivot shutters; and finally the elevating frame is lowered to a position most close to the article delivery positions, then the pivot shutters being opened to drop the articles toward the article delivery positions. During this process, articles are effectively supported by being merely contacted at the bottom and without being clamped from lateral sides. Thus, articles can be smoothly transferred by units of a required number each from the parallel transport conveyor to the article delivery positions.

Therefore, according to the method and apparatus for automatically supplying articles in alignment of the invention, it is possible to transfer articles to the article delivery positions at the packaging machine, without involving any deformation or damage caused to articles. Further, since no clamping is involved, it is possible to transport articles to the delivery positions without trouble, even where articles aligned on the parallel transport conveyor are very narrowly spaced from one another.

What is claimed is:

1. A method for automatically feeding articles in aligned condition to a packaging machine wherein plural lines of articles, as they are fed onto a parallel transport conveyor in laterally spaced relationship that corresponds to article delivery positions at the packaging machine, are aligned on the parallel transport conveyor in longitudinally spaced parallel relation, the thus aligned articles being then moved toward the delivery positions at the packaging machine by units of a required number each, said method comprising the steps of:

(a) feeding each required number of articles delivered while held in parallel from said parallel transport conveyor onto a positioning belt conveyor having comb-like interteeth clearances, said positioning conveyor comprising a comb-like frame having a plurality of projecting frames extending in a comb teeth-like fashion from a base frame in the direction of transport of the articles, and belts trained between a driving roller at the rear end of the comb-like frame and driven rollers at respective forward ends of the projecting frames, said comb-like frame being supported for upward and downward movement relative to the frame of article transfer means;

(b) causing the articles being conveyed by said positioning conveyor to dwell for a while on the positioning conveyor at longitudinally and laterally spaced positions corresponding to the delivery positions at the packaging machine, then stopping the movement of said positioning conveyor;

(c) descending said positioning conveyor slightly to cause holding bars of a slide conveyor to be exposed above the transport plane of said positioning conveyor through said comb-like interteeth clearances thereof, thereby to cause articles on the positioning conveyor to be transferred onto said holding bars at predtermined positions, said slide conveyor including a slider body horizontally movably supported by said frame of the article transfer means, said holding bars being arranged in pairs such that they extend in a fork-like fashion from said slider body in the direction of transport of the articles;

(d) then advancing the slide conveyor a predetermined distance thereby to move the articles on said holding bars to a location immediately above the delivery positions at the packaging machine as they are kept resting on said bars at the predetermined positions;

(e) elevating an elevating frame vertically movably supported by said frame of the article transfer means to a position at which the upper surface of pivot shutters mounted to said elevating frame is positioned slightly above the upper surface of said holding bars, thereby to cause the articles on said holding bars to be transferred onto said pivot shutters; and (f) moving the slide conveyor backward to its original position, then descending the elevating frame and opening the pivot shutters to allow the articles thereon to drop toward the delivery positions at the packaging machine.

2. An apparatus for automatically feeding articles in aligned condition to a packaging machine, including a parallel transport conveyor equipped with aligning means for aligning plural lines of articles in parallel on the parallel transport conveyor as they are fed onto the conveyor in laterally spaced relationship that corresponds to article delivery positions at the packaging machine, and article transfer means arranged between a terminal portion of the parallel transport conveyor and the packaging machine for moving the articles aligned on the parallel transport conveyor toward the delivery positions at the packaging machine by units of a required number each, said article transfer means comprising:

(a) a positioning conveyor, a slide conveyor, and loading means which are sequentially arranged in succession to said parallel transport conveyor;

(b) said positioning conveyor comprising a comb-like frame having a plurality of projecting frames extending in a comb teeth-like fashion from a base frame in the direction of transport of the articles, a driving roller rotatably mounted at the rear end of the comb-like frame, driven rollers rotatably supported at respective forward ends of the projecting frames, and belts trained between said driving roller and said driven rollers, said comb-like frame being upward and downward movably supported by the frame of said article transfer means, vertical drive means connected to said comb-like frame for vertically displacing the transport plane of the positioning conveyor by a predetermined quantity, and stoppers disposed above the positioning conveyor for engagement with the positioning conveyor so as to act on the articles being conveyed by said conveyor to bring the articles into alignment in corresponding relation to the delivery positions at the packaging machine;

(c) said slide conveyor comprising a slider body horizontally movably supported by the frame of the article transfer means for movement in the direction of transport of the articles, and holding bars arranged in pairs, one pair for each longitudinal line of articles aligned in parallel on said positioning conveyor, such that they extend in a fork-like fashion from said slider body in the direction of transport of the articles, longitudinal drive means connected to said slider body for back-and-forth movement of the slider body between a retreated position at which said holding bars are caused to overlap said positioning conveyor in the direction of transport of the articles and an advanced position at which the holding bars are kept away from overlapping said positioning conveyor, said holding bars being mounted to the slider body at such a position and at such a level that they are exposed above the transport plane of said positioning conveyor between respective belts thereof when said positioning conveyor is lowered at the retreated position at which said holding bars overlap the positioning conveyor and that they are retracted to a location below the transport plane of the positioning conveyor when said positioning conveyor is elevated; and (d) said loading means comprising an elevating frame disposed above the article delivery positions at the packaging machine and vertically movably supported by the frame of the article transfer means, said loading means positionally overlapping said holding bars of said slide conveyor at their advanced position, said elevating frame equipped with vertical drive means for elevating and lowering said frame while kept in a horizontal position and having a plurality of holes formed therein for passage of dropping articles in corresponding relation to the article delivery positions below said elevating frame, pairs of pivot shutters rotatably mounted to said elevating frame at a position slightly above the surface thereof such that said pairs of pivot shutters partially close said holes at a level above the holes and from both sides thereof, with a space left between each pair of said pivot shutters that is sufficient to allow each pair of said holding bars of the slide conveyor to be positioned, and rotation drive means for causing articles to drop after they are received onto the pivot shutters.

3. An apparatus for automatically feeding articles in aligned condition to a packaging machine as set forth in claim 2, wherein said loading means include a plurality of pusher plates arranged above the article delivery positions at the packaging machine and vertically movably supported by the frame of said article transfer means, vertical drive means connected to the pusher plates for elevating and lowering the pusher plates while holding them in their horizontal attitude, said pusher plates being positioned above the respective holes of said elevating frame in corresponding relation to the article delivery positions, said vertical drive means having a stroke necessary for causing said pusher plates, when said pivot shutters are opened, to act through said holes on articles supplied to said article delivery positions to force the articles into position.

4. An apparatus for automatically feeding articles in aligned condition to a packaging machine as set forth in claim 2, wherein said comb-like frame of said positioning conveyor has its base frame pivotally supported at the frame of said article transfer means and has its projecting frames vertically movably supported at forward ends thereof by said frame of the article transfer means through a fluid cylinder so that the transport plane of said positioning conveyor can be pivotally vertically displaced a predetermined distance when the piston rod of said fluid cylinder is stretched or retracted.

5. An apparatus for automatically feeding articles in aligned condition to a packaging machine as set forth in claim 2, wherein a pair of parallel rails are arranged at opposite sides of said slide conveyor and on the frame of said article transfer means at suitable locations, said slider body being longitudinally movably supported on said frame by means of grooved wheels which are rotatably carried by said slider body on both sides thereof, four wheels each side, at two longitudinally spaced locations and in such a manner that each rail is contacted by wheels from vertically opposite sides, there being disposed a fluid cylinder at a suitable location between said slider body and said frame for moving the slider body forward and backward.

6. An apparatus for automatically feeding articles in aligned condition to a packaging machine as set forth in claim 2, wherein at the position of each hole formed in said elevating frame are disposed guide plates for contacting sides of each article dropping through the hole.

* * * * *